United States Patent [19]
Hidaka et al.

[11] Patent Number: 5,271,044
[45] Date of Patent: Dec. 14, 1993

[54] BOILING WATER NUCLEAR REACTOR AND START-UP PROCESS THEREOF

[75] Inventors: Masataka Hidaka, Katsuta; Michio Murase, Mito; Toshitsugu Nakao, Hitachi; Akihiko Minato, Ibaraki; Shigeto Murata, Katsuta; Yoshiyuki Kataoka, Ibaraki; Shoichiro Kinoshita, Hitachi, all of Japan

[73] Assignee: Hitachi, Ltd., Tokyo, Japan

[21] Appl. No.: 851,198

[22] Filed: Mar. 14, 1991

[30] Foreign Application Priority Data

Mar. 14, 1991 [JP] Japan ................... 3-49550

[51] Int. Cl.⁵ .............................................. G21C 7/00
[52] U.S. Cl. ................................................ 376/214
[58] Field of Search ..................................... 376/214

[56] References Cited

U.S. PATENT DOCUMENTS

| 4,077,836 | 3/1978 | Omori et al. | 376/214 |
| 4,343,682 | 8/1982 | Grimes et al. | 376/214 |
| 4,734,249 | 3/1988 | Utamura et al. | 376/214 |

FOREIGN PATENT DOCUMENTS

| 59-143997 | 8/1984 | Japan. |
| 59-217188 | 12/1984 | Japan. |
| 60-69598 | 4/1985 | Japan. |
| 2-67997 | 3/1990 | Japan. |

OTHER PUBLICATIONS

"Transient Behavior of Natural Circulation for Boiling Two-Phase Flow", Aritomi et al, Japan Mechanical Society, 68th National Meeting, vol. C, Sep. 1990.

Primary Examiner—Daniel D. Wasil
Attorney, Agent, or Firm—Antonelli, Terry, Stout & Kraus

[57] ABSTRACT

In a boiling water nuclear reactor, a reactor primary cooling water line is filled with water at the start-up time, and the inside of a pressure vessel is pressurized by a pressurized tank and at the same time control rods are withdrawn to thereby heat cooling water in a state of single-phase flow to high temperature. Succeedingly, the pressurization is released and the pressure of the pressure vessel is gradually approximated to the saturation pressure corresponding to the cooling water temperature to thereby make the cooling water transit into a state of two-phase flow, and thereafter the cooling water is heated by nuclear reaction in the state of two-phase flow to thereby obtain predetermined reactor running temperature and pressure. This prevents the flow fluctuation and the reduction of stability of core due to occurrence of unstable phenomena of low temperature two-phase flow at the start-up time of the reactor to thereby make it possible to perform stable starting-up of the reactor and to shorten the start-up time of the reactor to thereby realize improvement in economy as well as reliability.

28 Claims, 20 Drawing Sheets

BOILING WATER NUCLEAR REACTOR AND START-UP PROCESS THEREOF

BACKGROUND OF THE INVENTION

The present invention relates to a boiling water nuclear reactor, and particularly relates to a start-up process of a natural circulation nuclear reactor in which circulation flow rate is secured by the hydrostatic head difference between the outside and inside of a reactor core (hereinafter also simply referred to as "core").

In a current water nuclear reactor, cooling water is circulated into a core by recirculation pumps at the start-up time after ordinary shut-down of the nuclear reactor (hereinafter also simply referred to as "reactor"), and the cooling water is heated by nuclear reaction by withdrawing control rods to thereby make the cooling water high in temperature as well as pressure. At this time, since the core is being cooled by forced circulation, the cooling water is in a state of single-phase flow. Being heated, the cooling water is made to transit monotonously from the state of single-phase flow into a state of two-phase flow to make it possible to perform stable starting-up of the reactor.

On the other hand, there is a boiling water reactor of the type in which at the start-up time, at least in a period from a non-critical state to a state in which an isolation valve is opened so that steam is discharged from the reactor, a core is cooled by natural circulation. For example, in a natural circulation reactor provided with no recirculation pumps, a hydrostatic head difference between the outside and inside of a shroud enclosing a core is used as driving force for the natural circulation of the cooling water in the core. Accordingly, if the cooling water is heated in the core by nuclear reaction at the start-up time after ordinary shut-down of the reactor, the cooling water outside and inside the shroud is circulated at a low flow rate by driving force generated by a density difference due to a temperature difference. When the water temperature becomes high and the subcool temperature at an inlet of the core becomes lower than the maximum subcool temperature to start boiling which is determined by physical properties and a circulation flow velocity, boiling is generated in the core. At this time, the hydrostatic head difference between the outside and inside of the shroud increases because of generation of steam bubbles to thereby increase the circulation flow velocity. By this, the quantity of cooling of the core increases so that the cooling water in the core comes back into the state of single-phase flow. This operation is repeated so that the state of single-phase flow and the state of two-phase flow are alternated to thereby generate flow fluctuations. This unstable phenomenon becomes remarkable under low temperature where the vapor-liquid density ratio is large and continues until the subcool temperature at the core inlet becomes lower than the minimum subcool temperature to cause unstable phenomena.

In such an unstable phenomenon at low temperature two-phase flow, the degree of void reaction of nuclear fuel fluctuates because of occurrence of flow fluctuations so that there arises a problem that the stability of the core can not be improved.

Further, in order to avoid such an unstable phenomenon at low temperature two-phase flow by making the temperature of the cooling water rise up in the state of single-phase flow to a temperature as high as possible while delaying the start of boiling, it is necessary to heat the cooling water with an extremely low quantity of heating by nuclear reaction for a long time. In this process, however, the circulation velocity in the core is so low that a phenomenon of thermal stratification occurs in the cooling water in a lower plenum in a pressure vessel and low temperature water stays in the lower plenum. Accordingly, when most of the cooling water becomes high temperature to start boiling, the low temperature water in the lower plenum flows into the core because of increase of the core circulation velocity to thereby generate a similar unstable phenomenon. Further, since the cooling water is heated with an extremely low quantity of heating by nuclear reaction, it takes a very long time for the start-up of the reactor to thereby extremely lower the economy in connection with the running of the reactor.

In a conventional system for preventing such an unstable phenomenon at low temperature two-phase flow, as disclosed in JP, A, 59-143997 and JP A 59-217188, at the start-up time of a natural circulation reactor, heat is supplied from a house boiler used in service inspection to cooling water in a pressure vessel of the reactor to raise the temperature of the cooling water and thereafter heating by nuclear reaction is started to thereby prevent lowering of core stability due to flow instability in the low temperature two-phase flow. In an alternative conventional process, as disclosed in JP, A, 60-69598, the temperature of a coolant inside a pressure vessel is raised through a heat exchanger so that the subcool temperature at a core inlet is set within a range smaller than the minimum sub-cool temperature to cause unstable phenomena, and thereafter output increase is started to thereby secure the stability of the core at the start-up time of the reactor.

In each of the above conventional techniques, equipment of heat is supplied by equipment inside/outside a housing and no improvement is made on the equipment of the reactor primary cooling system, the start-up process and the start-up characteristics. Further, heat of nuclear reaction is not used to raise the temperature of the cooling water, so that not only heat loss is generated for heat generation by a boiler and transportation of the heat but also in order to obtain the same quantity of heat as that of nuclear reaction, it is necessary to provide a large-scale boiler or it takes a long time for the start-up of the reactor, resulting in reduction in economy. Further, since a heat exchanger and a heat supply system are provided outside/inside a housing or inside a pressure vessel to increase the temperature of the cooling water, pipings and a control system are required to make the structure of the reactor complicated and there arises a problem that the economy and reliability can not be improved.

Further, even in the case of employing a process in which cooling water is heated with an extremely low quantity of heat of nuclear reaction for a very long time to thereby avoid the unstable phenomena in low temperature two-phase flow, there arises a problem that it takes a very long time for the start-up of the reactor and the economy in connection with the start-up of the reactor can not be improved.

SUMMARY OF THE INVENTION

A main object of the present invention is therefore to provide a boiling water reactor and a start-up process of the reactor, in which the flow fluctuation and the reduction in core stability due to occurrence of unstable phenomena in low temperature two-phase flow at the start-up time of the reactor can be prevented so that it is made possible to perform stable start-up of the reactor.

Another object of the present invention is to provide a boiling water reactor and a start-up process of the reactor, in which the start-up time is shortened and which is superior in economy and reliability.

In order to attain the above objects, according to an aspect of the present invention, provided is a start-up process of a boiling water reactor having a pressure vessel in which a core loaded with nuclear fuel is incorporated, cooling water is retained and steam is generated, wherein the process comprises: (a) a first step of pressurizing the inside of the pressure vessel from the outside of the pressure vessel and heating the cooling water while keeping the cooling water in a single-phase flow state, at the time of starting-up of the reactor; (b) a second step of making the cooling water in the pressure vessel transit from the single-phase flow state into a two-phase flow state after the first step; and (c) a third step of heating the cooling water in the two-phase flow state.

In the first step, the inside of the pressure vessel is pressurized and the heating is carried out, so that the subcool temperature of the cooling water in the pressure vessel becomes high to thereby prevent boiling of the cooling water and the cooling water is heated to a high temperature in the state of single-phase flow left as it is. As a result, the cooling water is in a condition where generation of unstable phenomena is suppressed when the cooling water transits into a state of two-phase flow. That is, by the rising of the cooling water temperature, the vapor-liquid density ratio becomes small and the density difference between the density in the state of single-phase flow and the density in the state of two-phase flow becomes small, so that the flow fluctuation becomes small. Further, since the temperature of the cooling water is high, the transit from the state of single-phase flow into the state of two-phase flow becomes easy, and the flow fluctuation becomes small. In the second step, therefore, the cooling water transits into the state of two-phase flow through the state in which generation of unstable phenomena is suppressed. Thereafter, the cooling water is heated in the state of two-phase flow so that the subcool temperature of the cooling water decreases to generate boiling to make it possible to obtain the rated reactor running temperature and pressure easily.

According to the above start-up process, the flow fluctuation and the reduction in core stability due to occurrence of unstable phenomena in low temperature two-phase flow at the start-up time of the boiling water reactor can be prevented to thereby make it possible to perform stable and highly reliable start-up of the reactor. Further, it is possible to shorten the start-up time of the reactor to thereby improve the economy.

Specifically, in the above first step, the cooling water may be kept in the single-phase flow state by controlling the pressure in the pressure vessel so as to make the pressure in the pressure vessel higher than the saturation pressure of the cooling water corresponding to the temperature of the cooling water in the pressure vessel. Thus, the cooling water can be surely kept in the single-phase flow state.

The above first step may be a step in which the inside of the pressure vessel is pressurized solely first and thereafter the cooling water is heated while controlling the pressure in the pressure vessel. Alternatively, the first step may be a step in which the pressurization in the inside of the pressure vessel is started simultaneously with start of heating the cooling water so that the heating of the cooling water and the pressurization in the inside of the pressure vessel are carried out simultaneously and parallelly with each other.

Specifically, in the above second step, the cooling water may be made to transit from the single-phase flow state into the two-phase flow state at least by controlling the pressure in the pressure vessel. More specifically, the second step may be a step in which the cooling water is made to transit from the single-phase flow state into the two-phase flow state by controlling the pressure in the pressure vessel so as to make the pressure in the pressure vessel gradually approximate to the saturation pressure of the cooling water corresponding to the temperature of the cooling water in the pressure vessel until predetermined pressure not higher than the rated running pressure of the reactor is reached. Thus, the cooling water can be made surely to transit into the two-phase flow state. In this case, preferably, the control on the pressure in the pressure vessel is performed so that the pressure in the pressure vessel is kept to be substantially constant or reduced to thereby make the pressure in the pressure vessel gradually approximate to the saturation pressure. Thus, it is possible to make the cooling water be in a state of saturation surely before the pressure in the pressure vessel reaches the rated running pressure of the reactor, so that it is possible to make the cooling water in the pressure vessel transit early into the state of two-phase flow to thereby shorten the time taken for transit to the state of two-phase flow and shorten the time taken for raising temperature by boiling in the saturation state thereafter. Thus, the start-up time can be further shortened.

Further, it is preferable that when the control on the pressure in the pressure vessel is performed, the quantity of heat for heating the cooling water is reduced or heating the cooling water is once stopped. Thus, the heating in the core is suppressed to present boiling so that it is possible to make the cooling water transit into the state of two-phase flow in the condition that unstable phenomena are prevented substantially completely from occurring to thereby make it possible to perform stable start-up of the reactor.

Further, the above second and third steps may be performed in a single step of continuously controlling the pressure in the pressure vessel so as to make the pressure in the pressure vessel reach the saturation pressure of the cooling water corresponding to the temperature of the cooling water in the pressure vessel at the rated running pressure of the reactor. Alternatively, the above second step may be a step of controlling the pressure in the pressure vessel so as to make the pressure in the pressure vessel reach the saturation pressure of the cooling water corresponding to the temperature of the cooling water in the pressure vessel at predetermined pressure not higher than the rated running pressure of the reactor, and the above third step may be a step of increasing the pressure in the pressure vessel by heating the cooling water.

Further, preferably, the above first step may include a step of calculating a first critical thermal power in the single-phase flow on the basis of respective measured values of the temperature of the cooling water, the pressure in the pressure vessel, and the flow rate of the core to thereby set amounts of withdrawal of control rods for controlling a power of the core so that the thermal power of the core becomes not larger than the first critical thermal power, and the above third step may include a step of calculating a second critical thermal power in the two-phase flow on the basis of respective measured values of the temperature of the cooling water, the pressure in the pressure vessel, and the flow rate of the core to thereby set the amounts of withdrawal of the control rods so that the thermal power of the core becomes not larger than the second critical thermal power. Thus, it is possible to perform stable start-up of the rector and to further shorten the start-up time of the reactor.

Preferably, the above second and third steps may include: a step of controlling related valves so as to keep the water level in the pressure vessel at a proper value on the basis of respective measured values of the pressure and water-temperature in the pressure vessel, the water temperature at an inlet of the core, the water level in the pressure vessel, the power of the core and the amounts of insertion of control rods; and a step of controlling respective openings of related values to make a flow rate of feed water proper on the basis of respective measured values of the power of the core and the subcool temperature at the inlet of the core.

Further, preferably, the reactor related to the start-up process according to the present invention may comprise a main steam line for feeding steam generated in the core to a turbine, a feed water line for feeding condensate water condensed in a condenser after driving of the turbine into the pressure vessel as cooling water, a main steam isolation valve, a turbine steam stop valve for stopping a steam flow into the turbine, and a control valve for controlling a steam flow rate into the turbine which are arranged in the main steam line, a feed water pump and a feed water stop valve which are arranged in the feed water line, a turbine bypass line for connecting the main steam line to an inlet of the condenser at a portion of the main steam line between the main steam isolation valve and the turbine steam stop valve, a turbine bypass stop valve arranged in the turbine bypass line, control rods for controlling the power of the core, and a pressure regulator provided in at least one of the pressure vessel, the main steam line and the feed water line; and in the start-up process according to the present invention, the above first step may include a step of isolating the pressure vessel by closing the main steam isolation valve and the feed water stop valve, a step of pressurizing the inside of the pressure vessel by the pressure regulator, and a step of heating the cooling water in the single-phase flow state by withdrawing the control rods, and the above second and third steps may include a step in which the pressurization by the pressure regulator is released and the main steam isolation valve and the turbine bypass stop valve are opened so that the pressure in the pressure vessel is reduced and a water level is formed in the pressure vessel.

Further, preferably, the reactor related to the start-up process according to the present invention may further comprise a feed water bypass line for connecting the feed water line, at a outlet side of the feed water pump, to the inlet of the condenser, and a feed water bypass stop valve arranged in the feed water bypass line; and in the start-up process according to the present invention, the above first step may further include a step of closing the turbine steam stop valve and the turbine bypass stop valve, opening the feed water bypass stop valve and operating the feed water pump to thereby circulate feed water to the condenser, and thereafter pressurizing the inside of the pressure vessel.

Preferably, the above second step may includes a step of inserting the control rods to reduce the power of the core after increase of the cooling water temperature, and the above third step may include a step of withdrawing the control rods again to heat the cooling water in the two-phase flow state.

Preferably, in the above first step, the cooling water is heated by nuclear reaction while keeping the cooling water in the single-phase flow state by making the pressure P1 in the pressure vessel satisfy the condition $P1 > P2$ while keeping the condition $T2 < T1 - Tb$, where T1 represents the saturation temperature of the cooling water at the pressure P1, T2 represents the temperature of the cooling water, P2 represents the saturation pressure corresponding to the temperature T2, and Tb represents the maximum value of core inlet subcool temperature to start boiling.

Alternatively, in the above second step, the cooling water may be made to transit from the single-phase flow state into the two-phase flow state by making the pressure P1 in the pressure vessel satisfy the condition $P1 > P2$ while keeping the condition $T1 < T2 + Ts$, where Ts represents the maximum value of core inlet subcool temperature in a region in which stable boiling occurs, or may be made to transit from the single-phase flow state into the two-phase flow state by making the pressure P1 in the pressure vessel satisfy the condition $P1 = P2$ while keeping the condition $T1 < T2 + Ts$.

Preferably, the reactor related to the start-up process according to the present invention may comprise an electric heater provided in at least one of the pressure vessel, the main steam line and the feed water line; and in the start-up process according to the present invention, in at least one of the above first, second and third steps, the cooling water may be heated by nuclear reaction and at the same time heated by the electric heater. Alternatively, in at least one of the above first, second and third steps, the cooling water may be heated by nuclear reaction and at the same time heated by heat due to rotation of a feed water pump being operated. Thus, by use of a step of heating by nuclear reaction and heating by any other method, the start-up time of the reactor can be further shortened.

Further, the reactor related to the start-up process according to the present invention may comprise a start-up feed water line formed by bypassing a feed water line and having a start-up feed water stop valve, a cooling water outlet of the start-up feed water line being connected to a portion below the core in the pressure vessel; and in the start-up process according to the present invention, in at least one of the above first, second and third steps, the cooling water is heated by nuclear reaction and at the same time the cooling water is forcedly circulated to the core by a feed water pump through the start-up feed water line to thereby increase the core flow rate. Thus, by use of a step of heating by nuclear reaction and heating by any other method, the start-up time of the reactor can be further shortened.

Further, in order to attain the above objects, according to another aspect of the present invention, provided is a boiling water reactor which comprises: a pressure vessel in which a core loaded with nuclear fuel is incorporated, cooling water is retained and steam is generated; pressure regulator means disposed outside the pressure vessel and made communicate with the pressure vessel for pressurizing the inside of the pressure vessel at the time of starting-up of the reactor; and control means for actuating the pressure regulator means to operate at the time of starting-up of the reactor.

Preferably, the above pressure regulator means may include a pressurized tank connected to a feed water line, a high pressure gas tank connected to the pressurized tank, means provided between the pressurized tank and the gas tank for supplying a gas from the gas tank to the pressurized tank, and means for controlling discharge of the gas out of the pressurized tank.

The above pressure regulator means may include a leakage test system connected to a feed water line for testing leakage of the pressure vessel and a reactor primary cooling water line.

The above pressure regulator means may include a pressurized tank connected to a feed water line and provided therein with an electric heater.

The above pressure regulator means may include a high pressure gas tank connected to one of the pressure vessel and a main steam line.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 1:
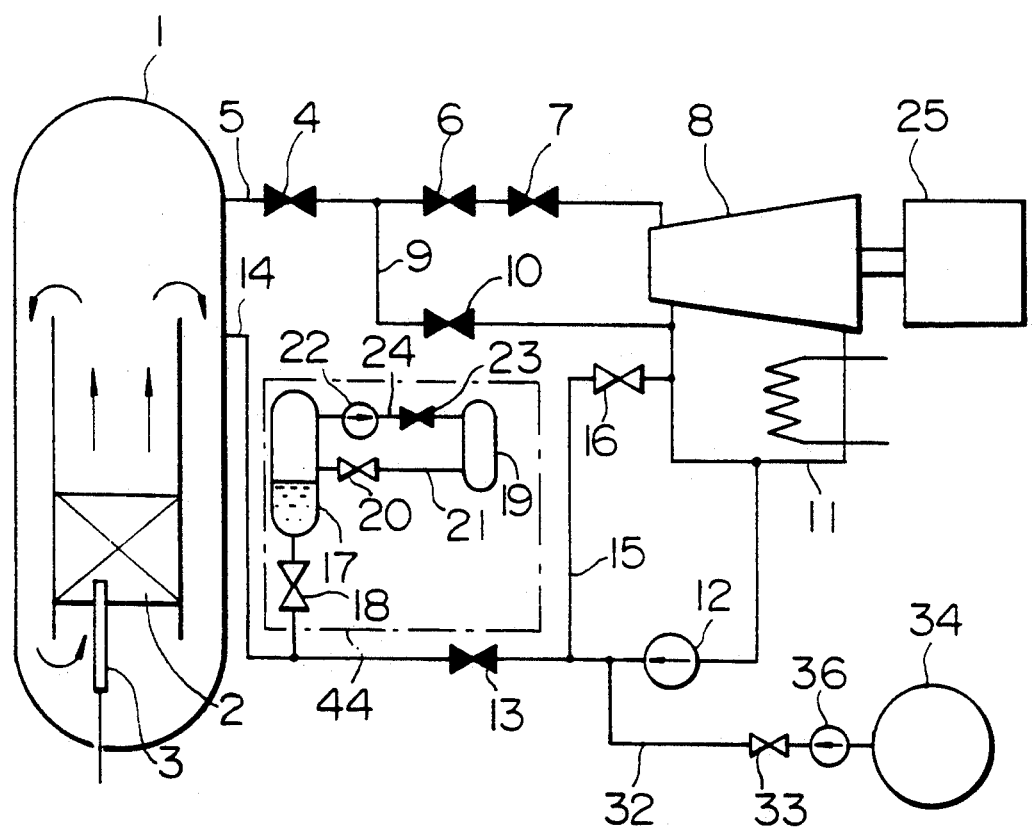
FIG. 1 is a system diagram illustrating the whole configuration of the natural circulation reactor in which the start-up process according to a first embodiment of the present invention is carried out and showing a step of the start-up process.

The present invention is applied to the boiling water reactor of the type in which a core is cooled by natural circulation at least in a period from a subcritical state to a condition in which steam is discharged from the reactor at start-up of the reactor. The following embodiments of the present invention are illustrated in the case where the invention is applied to the natural circulation boiling water reactor as an example. At the start-up of the reactor, a process from a subcritical state to a critical state, a heating and pressurizing process, a reactor power increasing process, a process of feeding steam from the reactor to a turbine, a process of obtaining a rated reactor power are made successively in this order.

The present invention is particularly related to the heating and pressurizing process for changing the state of the reactor to a state of rated temperature (280° C., for example) and rated pressure (70 Kg/cm², for example) among the processes of the start-up of the reactor. The heating and pressurizing process can be carried out by natural circulation.

First Embodiment

A first embodiment of the present invention will be described hereunder with reference to FIGS. 1 through 5. In FIG. 1 and FIGS. 3 through 5, valves black-painted in the drawings show the condition that the valves are closed, and valves white-pained in the drawings show the condition that the values are opened. FIG. 2 shows respective changes with the passage of time, of system pressure, cooling water temperature and core inlet subcool temperature at starting-up of a reactor.

Figure 2:
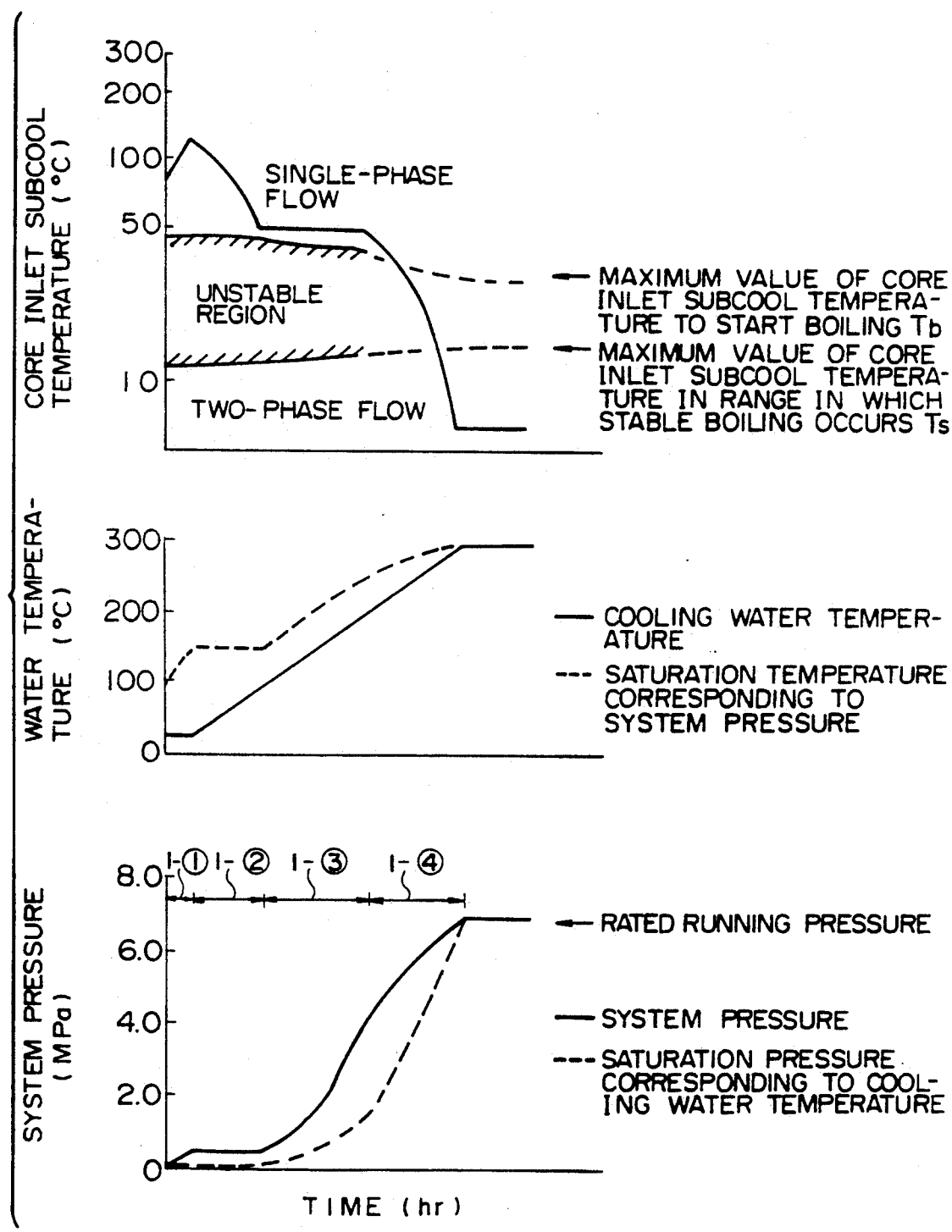
FIG. 2 shows graphs illustrating temporal changes of the pressure and temperature of the reactor system and the subcool temperature at the core inlet in the start-up process according to the first embodiment of the present invention.

In FIG. 1, a pressure vessel 1 contains a core 2 loaded with nuclear fuel, and the core output power is controlled by inserting or withdrawing control rods 3. The pressure vessel 1 is connected to a turbine 8 through a main steam line 5 having a main steam isolation valve 4, a turbine steam stop valve 6 for stopping a steam flow into the turbine, and a control valve 7 for controlling a steam flow rate into the turbine. A generator 25 is connected to the turbine 8. After driving the turbine, the steam is condensed by a condenser 11, which is connected to the pressure vessel 1 through a feed water line 14 having a feed water pump 12 and a feed water stop valve 13. The main steam line 5 from the main steam isolation valve 4 to the turbine steam stop valve 6 is connected to a turbine bypass line 9 having a turbine bypass stop valve 10 in an inlet of the condenser 11. The feed water line 14 in the discharge side of the feed water pump 12 and the inlet of the condenser 11 are connected to each other by a feed water bypass line 15 having a feed water bypass stop valve 16.

A pressure regulator 44 for pressurizing the pressure vessel 1 is connected to the feed water line 14 between the pressure vessel 1 and the feed water stop valve 13. The pressure regulator 44 comprises a valve 18, a pressurized tank 17 connected to the feed water line 14 through the valve 18, a line 21 including a valve 20, a high pressure gas tank 19 for supplying a high pressure gas to the pressurized tank 17 through the line 21 including the valve 20, and a line 24 including a compressor 22 and a valve 23 for connecting the pressurized tank 17 to the high pressure gas tank 19 to drain the gas from the pressurized tank 17 to thereby reduce the pressure in the pressurized tank 17. Although this embodiment shows the case where the gas in the pressurized tank 17 is drained through the line 24 including the compressor 22 and the valve 23, it is to be understood that the gas may be drained directly to a gas treatment system in the reactor containment vessel to thereby reduce the pressure in the pressurized tank 17. The high pressure gas tank 19 preferably may be provided as an interchangeable Bombe (interchangeable gas cylinder).

The feed water line 14 is connected to a condensate storage tank 34 through a condensate feed/drain line 32 having a condensate feed/drain valve 33 and a condensate pump 36 in the discharge side of the feed water pump 12.

The start-up process of the aforementioned natural circulation boiling water reactor will be described hereunder with reference to FIGS. 2 through 5 in addition to FIG. 1.

At starting-up of the reactor after ordinary shut-down, for example, a reactor primary cooling water system comprising the pressure vessel 1, the main steam line 5 and the feed water line 14 is filled with water by supplying the condensate from the condensate storage tank 34 by opening the condensate feed/drain valve 33 and driving the condensate pump 36 in the condition that the main steam isolation valve 4, the turbine steam stop valve 6, the feed water stop valve 13 and the turbine bypass stop valve 10 are opened. The portion of the main steam line 5 from the pressure vessel 1 to the steam isolation valve 4 is generally inclined upwards to increase the level, so that the reactor primary cooling water line can be filled with water in the level not lower than the level of the junction of the main steam line 5 with the pressure vessel 1. When, for example, the level of the main steam line 5 is insufficient, a vent valve may be provided in the top portion of the pressure vessel 1 so that the reactor primary cooling water line can be filled with water in the sufficient level by opening the vent valve.

After the filling with water is completed, a portion of the reactor primary cooling water system including the pressure vessel is isolated by closing the main steam isolation valve 4, the turbine steam stop valve 6, the feed water stop valve 13 and the turbine bypass stop valve 10 as shown in FIG. 1. Then, preferably, the feed water system is placed on standby by pump-heating the cooling water and preparatorily circulating the cooling water by opening the feed water bypass stop valve 16 and driving the feed water pump 12 to circulate the condensate to the condenser 11. Then, the inside of the pressure vessel 1 is pressurized to pressure P1 by the pressure regulator 44 (see 1-①in FIG. 2). Hereinafter, the pressure P1 in the pressure vessel 1 is referred to as "system pressure". In the case of FIG. 2, the system pressure P1 is 0.5 MPa. Assuming now that saturation temperature corresponding to the system pressure P1 is T1, T1 is 151° C. when P1 is 0.5 MPa.

After the reactor primary cooling water is pressurized as described above, the cooling water is heated by heat of nuclear reaction produced in the core 2 by withdrawing the control rods 3 (see 1-② in FIG. 2). Even in the case where the cooling water temperature T2 is heated to 100° C. by heat of nuclear reaction in the core 2, under the conditions that the system pressure and corresponding saturation temperature are respectively 0.5 MPa and 151° C. as described above, the cooling water subcool temperature in the inlet of the core is not lower than 50° C. and thus the cooling water is still in a single-phase flow state.

The cooling water is further heated by heat of nuclear reaction in the aforementioned procedure, so that the cooling water temperature T2 is raised to 200° C. (see 1-③ in FIG. 2). In this step, not only the system pressure P1 is always set to be higher than the saturation pressure P2 corresponding to the cooling water temperature T2 (P1>P2) but it is set to a value satisfying the following condition (1), by the pressure regulator 44 so that the cooling water can be heated up to a high-temperature and high-pressure state while it is kept as a single-phase flow.

$$T2 < T1 - Tb \tag{1}$$

In this condition (1), Tb represents maximum subcool temperature to start boiling, which depends on cooling water temperature, system pressure, flow rate, heat of nuclear reaction, etc. In the case of FIG. 2, the system pressure P1 is set to 1.6 MPa (corresponding saturation temperature: 200° C.) when the cooling water temperature T2 is 150° C., and the system pressure P1 is set to 4.1 MPa (corresponding saturation temperature: 250° C.) when the cooling water temperature T2 is 200° C. Further, the subcool temperature in the inlet of the core is set to be not lower than 50° C.

The occurrence of unstable phenomena is suppressed by raising the cooling water temperature T2 as described above, even if the state of the cooling water is transited to a two-phase flow state. That is, the density ratio of gas to liquid is reduced by raising the cooling water temperature. Accordingly, the density difference between the single-phase flow state and the two-phase flow state is reduced, so that fluctuation in fluidity becomes small. Further, the cooling water temperature is so high that transition from the single-phase flow state to the two-phase flow state can be made easily. Accordingly, fluctuation in fluidity becomes small.

As described above, after the cooling water temperature T2 is raised, the pressure P1 in the pressure vessel 1 is gradually approximated to the saturation pressure P2 corresponding to the cooling water temperature T2 by the pressure regulator 44 (see 1-④ in FIG. 2). In the case of FIG. 2, the control rods 3 are continuously withdrawn and the cooling water is heated by heat of nuclear reaction produced in the core 2. The system pressure is regulated by the pressure regulator 44 so that the system pressure P1 substantially reaches a rated running pressure at a point of time when the cooling water temperature T2 reaches a rated running temperature (that is, at a point of time when the saturation pressure P2 corresponding to the cooling water temperature T2 reaches a rated running pressure). In this step, the subcool temperature in the inlet of the core is lowered, so that the state of the cooling water in the core 2 is transited to a two-phase flow state via a state in which unstable phenomena are suppressed, because the cooling water is high in temperature and small in the density ratio of liquid to gas. The point of time when the state of the cooling water is transited to a two-phase flow state corresponds to a point of time when the system pressure reaches a predetermined pressure not higher than the rated running pressure. This point of time substantially corresponds to a point of time when the following condition (2) is satisfied.

$$P1 > P2, \quad T1 < T2 + Ts \qquad (2)$$

In this condition (2), Ts represents a maximum value of core inlet subcool temperature in a region in which stable boiling occurs. The maximum value depends on cooling water temperature, system pressure, flow rate, heat of nuclear reaction, etc.

Figure 3:
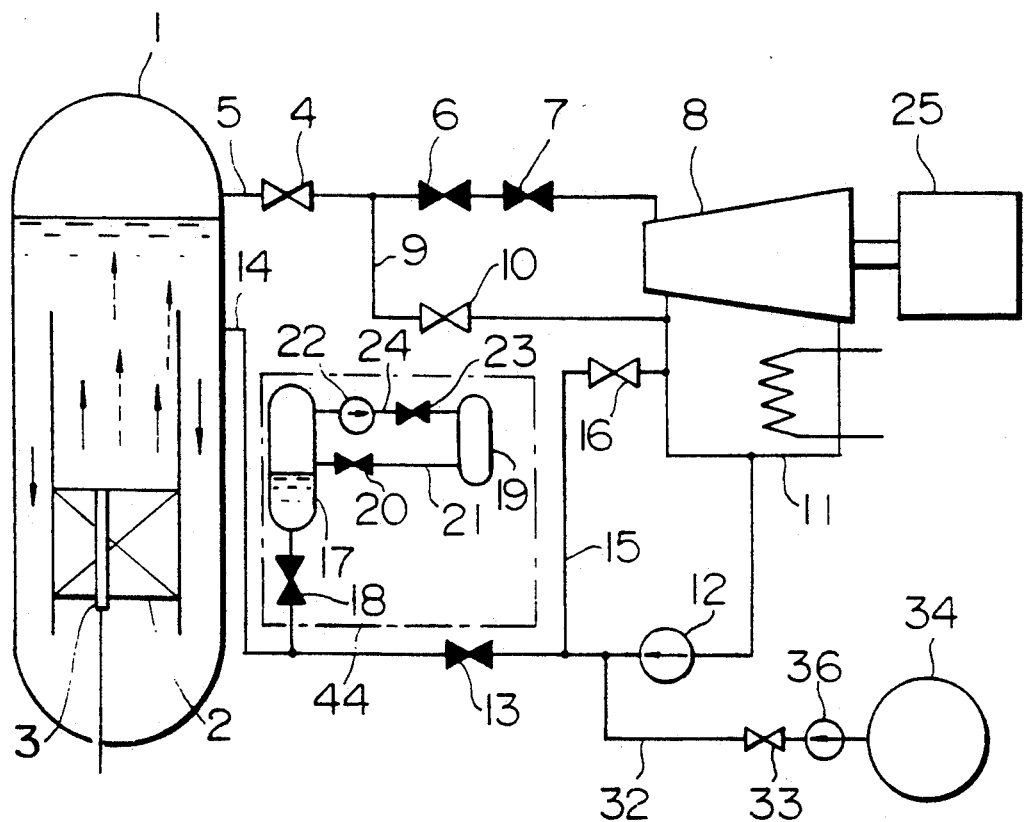
FIG. 3 is a system diagram similar to FIG. 1 illustrating another step in the start-up process according to the first embodiment of the present invention.

In this step (1-④ in FIG. 2), not only pressurization by the pressure regulator 44 is released but pressurization of the cooling water is released by opening the main steam isolation valve 4 and the turbine bypass stop valve 10 as shown in FIG. 3, so that a water level is formed in the pressure vessel 1 to make it possible to shift the state of the system to a rated running state. At this time, the water level is controlled by opening and closing the condensate feed/drain valve 33 and the feed water stop valve 13 to obtain a proper water level in the pressure vessel 1.

The terminology "pressurization by the pressure regulator 44 is released" means that the gas is drained from the pressurized tank 17 by opening the valve 23 and driving the compressor 22 in FIG. 1. In the case where the gas in the pressurized tank 17 is directly released to a gas treatment system in the reactor containment vessel, this terminology means the release of the gas. In the characteristic graph of system pressure in FIG. 2, this pressure control corresponds to the reduction of the difference between the system pressure P1 (expressed by the solid line) and the saturation pressure P2 (expressed by the broken line) corresponding to the cooling water temperature T2.

Figure 4:
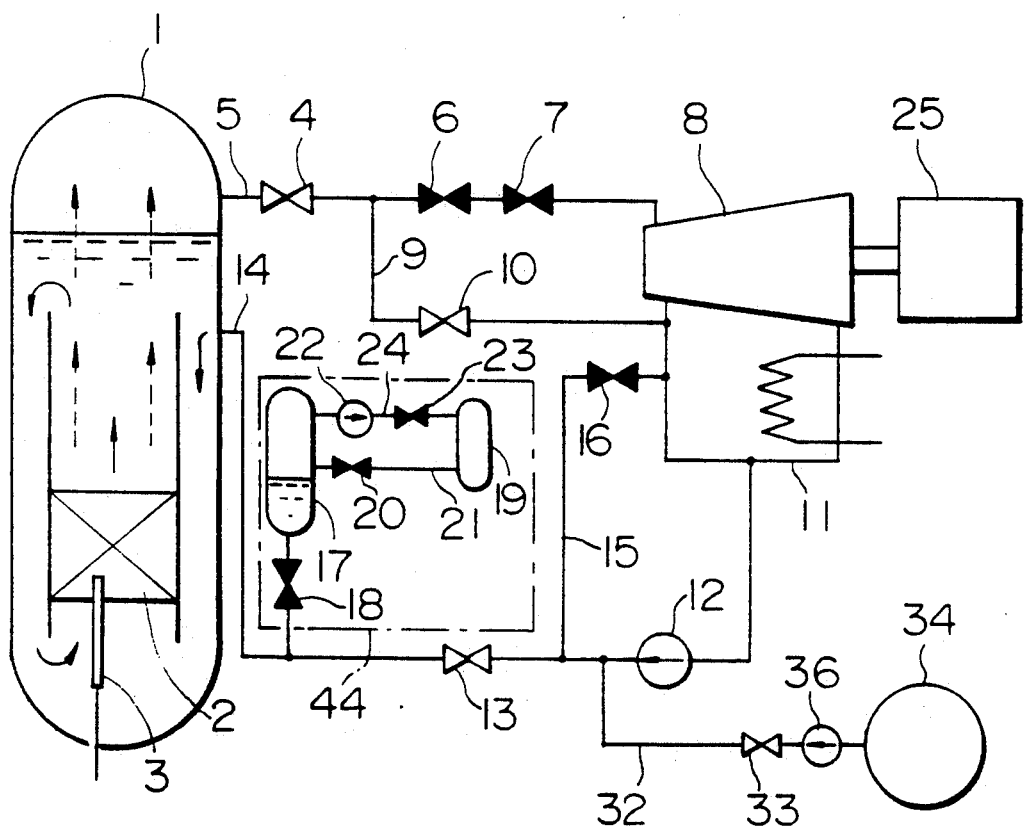
FIG. 4 is a system diagram similar to FIG. 1 illustrating a further step in the start-up process according to the first embodiment of the present invention.
Figure 5:
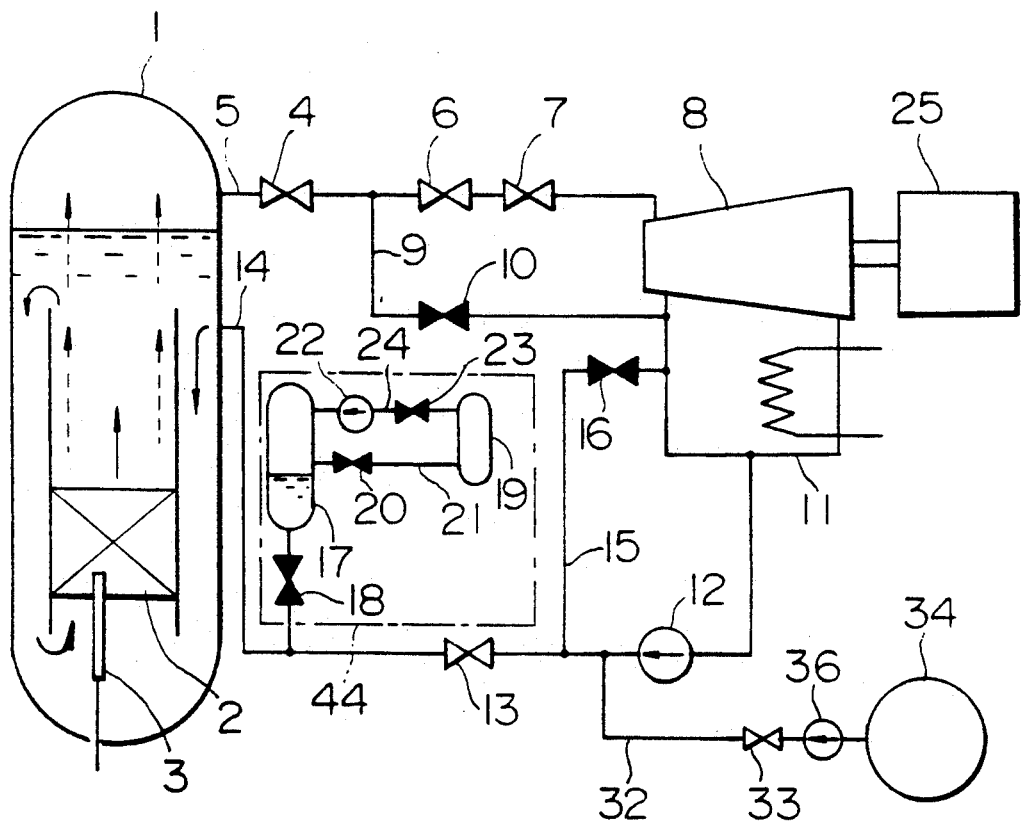
FIG. 5 is a system diagram similar to FIG. 1 illustrating a still further step in the start-up process according to the first embodiment of the present invention.

Then, as the system pressure and the cooling water temperature respectively reach the rated running pressure and temperature, the feeding of water to the pressure vessel 1 is started by opening the feed water stop valve 13 as shown in FIG. 4 and then the rotating of the turbine 8 is started by opening the turbine steam stop valve 6 and the turbine stream flow rate control valve 7 and closing the turbine bypass stop valve 10 as shown in FIG. 5. The feed water flow rate at this time is determined by heat of nuclear reaction in the core 2 and thermal balance between circulating water and supplied water and is controlled by the feed water stop valve 13 and the feed water bypass stop valve 16.

In the aforementioned start-up process, the cooling water at low temperature is heated in a single-phase flow state and the cooling water is transferred into the two-phase flow state after the high temperature is attained, and then the cooling water is heated in the two-phase flow state. Accordingly, unstable fluidity phenomena caused by the two-phase flow at low temperature can be avoided. Further, since the cooling water is heated while the inside of the pressure vessel 1 is pressurized, the time required for heating the cooling water to a high temperature in a single-phase flow state can be shortened, so that the start-up time can e shortened.

According to the embodiment, both fluctuation in fluidity and lowering of core stability caused by the occurrence of unstable phenomena in two-phase flow at low temperature can be prevented at the time of the starting-up of the natural circulation boiling water reactor whereby a stable and reliable start-up process of the reactor can be assured. Further, the start-up time of the reactor can be shortened to attain economical improvement.

Modification

Figure 6:
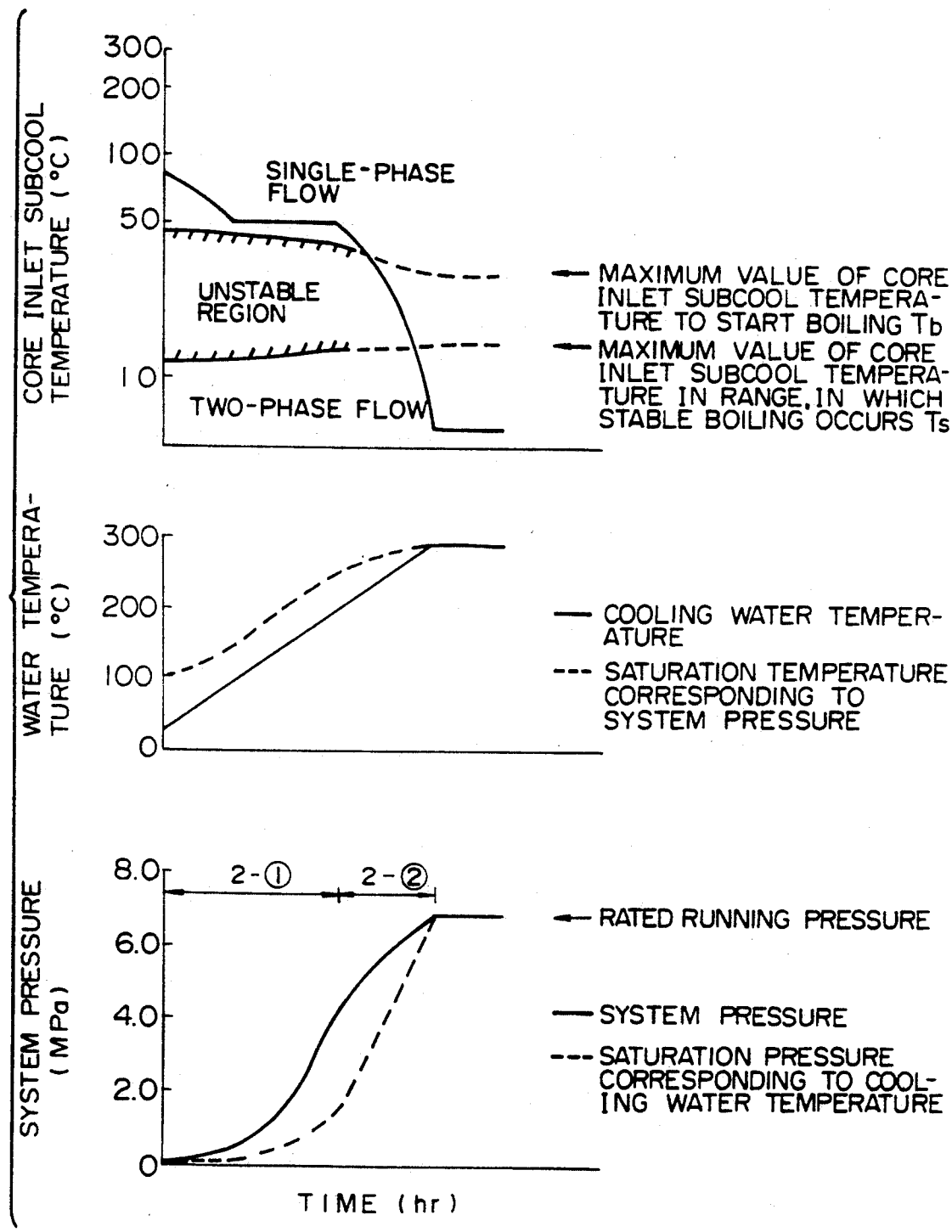
FIG. 6 shows graphs illustrating temporal changes of the pressure and temperature of the reactor system and the subcool temperature at the core inlet in the start-up process according to a modification of the first embodiment of the present invention.

A modification of the first embodiment will be described hereunder with reference to FIG. 6. In the first embodiment, the system pressure is preparatorily increased by the pressure regulator 44 at the time of starting of the heating of the reactor primary cooling water (1-① in FIG. 2). In this modification shown in FIG. 6, the system pressure is slowly and continuously increased when the heating of the cooling water is started (2-① in FIG. 6), so that the cooling water is heated to high temperature as it is kept in a single-phase state. In this modification, the pressurizing procedure (1-① in FIG. 2) in the first embodiment can be omitted, so that there arises an effect that the start-up time of the reactor can be shortened more greatly.

Second Embodiment

Figure 7:
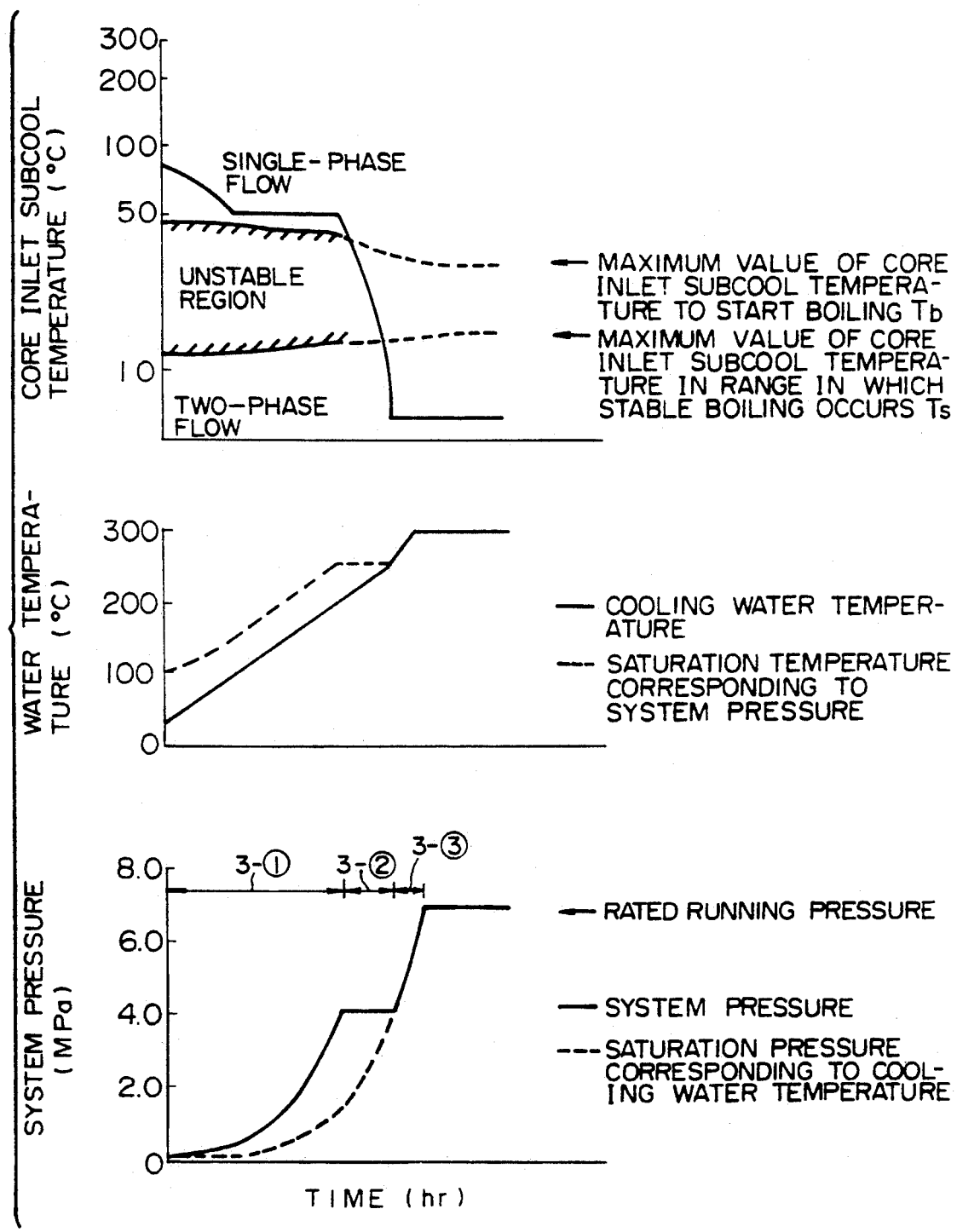
FIG. 7 shows graphs illustrating temporal changes of the pressure and temperature of the reactor system and the subcool temperature at the core inlet in the start-up process according to a second embodiment of the present invention.

A second embodiment of the invention will be described with reference to FIG. 7. In the first embodiment, in the start-up process of the natural circulation boiling water reactor, the cooling water is heated up to a high-temperature and high-pressure state by heat of nuclear reaction as it is kept in a single-phase flow state, and then the pressure P1 in the pressure vessel 1 is controlled by the pressure regulator 44 to be gradually approximated to the saturation pressure P2 corresponding to the cooling water temperature T2 after the cooling water temperature T2 is raised to reduce the density ratio of liquid to gas sufficiently to suppress the occurrence of unstable phenomena. In the case of FIG. 7, the system pressure P1 is gradually approximated to the saturation pressure P2 while the system pressure is kept substantially constant or slightly increased (see 3-②) in FIG. 7). Accordingly, the cooling water can be saturated before the system pressure P1 reaches the rated running pressure, so that the state of the cooling water in the core 2 can be transited to a two-phase flow state at an early stage. The point of time when the state of the cooling water is transited to a two-phase flow state substantially corresponds to a point of time when the system pressure is not higher than the rated running pressure and satisfies the following condition (3).

$$P1=P2, T1<T2+Ts \quad (3)$$

In this condition (3), Ts represents a maximum value of core inlet subcool temperature in a region in which stable boiling occurs. The maximum value depends on cooling water temperature, system pressure, flow rate, heat of nuclear reaction, etc.

With respect to the pressure control, not only pressurization by the pressure regulator 44 is released but pressurization of the pressure vessel 1 is released by opening the main steam isolation valve 4 and the turbine bypass stop valve 10 as shown in FIG. 3, so that a water level is formed in the pressure vessel 1 to make it possible to shift the state of the system to a rated running state smoothly in the same manner as in the first embodiment. At this time, the water level is controlled by opening and closing the condensate feed/drain valve 33 and the feed water stop valve 13 to obtain a proper water level in the pressure vessel 1.

Thereafter, the control rods 3 are continuously withdrawn and the cooling water is heated by heat of nuclear reaction produced in the core 2, to obtain the rated running temperature and pressure of the reactor (see 3-③ in FIG. 7). Thereafter, the same procedure as in the first embodiment is applied to this embodiment.

Accordingly, in this embodiment, the state of the cooling water in the core 2 can be transited to a two-phase flow state at an early stage, so that boiling in the two-phase flow state occurs and thus thermal conductivity in the core is improved. Accordingly, heat by nuclear reaction can be increased, and thus the time required for heating the cooling water to make the system pressure P1 reach the rated running pressure can be shortened (see 3-③ in FIG. 7). Further, in FIG. 7, the time required for making the core inlet subcool temperature of the cooling water pass between the maximum value Tb of subcool temperature to start boiling and the maximum value Ts of subcool temperature in a region in which stable boiling occurs can be also shortened. Accordingly, not only economical improvement related to the start-up of the reactor can be obtained but reliability related to the start-up of the reactor can be improved because unstable fluidity phenomena caused by the two-phase flow at low temperature can be avoided more easily compared with the first embodiment.

According to the embodiment, in addition to the effects in the first embodiment, there arise effects in that a more stable start-up process of the reactor can be provided and in that the start-up time of the reactor can be shortened more greatly.

Modification

Figure 8:
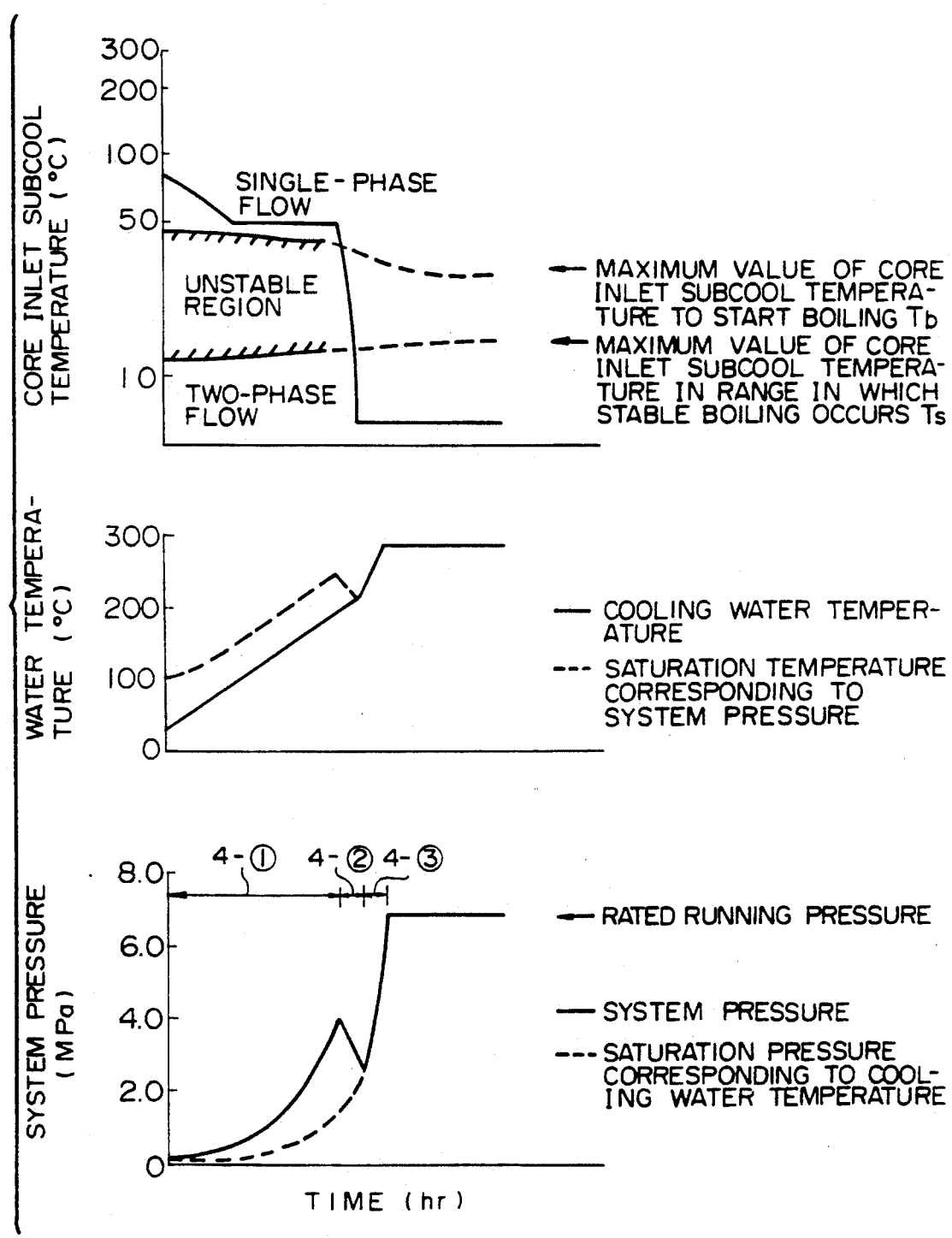
FIG. 8 shows graphs illustrating temporal changes of the pressure and temperature of the reactor system and the subcool temperature at the core inlet in the start-up process according to a modification of the second embodiment of the present invention.

A modification of the second embodiment will be described hereunder with reference to FIG. 8. In the embodiment in FIG. 7, the system pressure is kept substantially constant or slightly increased when the system pressure P1 is gradually approximated to the saturation pressure P2 (see 3-② in FIG. 7). In this modification, the system pressure is reduced when the system pressure P1 is gradually approximated to the saturation pressure P2 (see 4-② in FIG. 8). Accordingly, the cooling water can be saturated in a shorter time compared with the case of FIG. 7. Accordingly, the state of the cooling water in the core can be transited to a two-phase flow state at an earlier stage, so that the time required for heating the cooling water to make the system pressure P1 reach the rated running pressure can be shortened more greatly (see 4-③ in FIG. 8). Further, the time required for making the core inlet subcool temperature of the cooling water pass between the maximum value Tb of subcool temperature to start boiling and the maximum value Ts of subcool temperature in a region in which stable boiling occurs can be also shortened more greatly (see 4-② in FIG. 8). Accordingly, in this modification, not only economical improvement related to the start-up of the reactor can be obtained but reliability related to the start-up of the reactor can be improved because unstable fluidity phenomena caused by the two-phase flow at low temperature can be avoided more easily compared with the case of FIG. 7.

Third Embodiment

Figure 9:
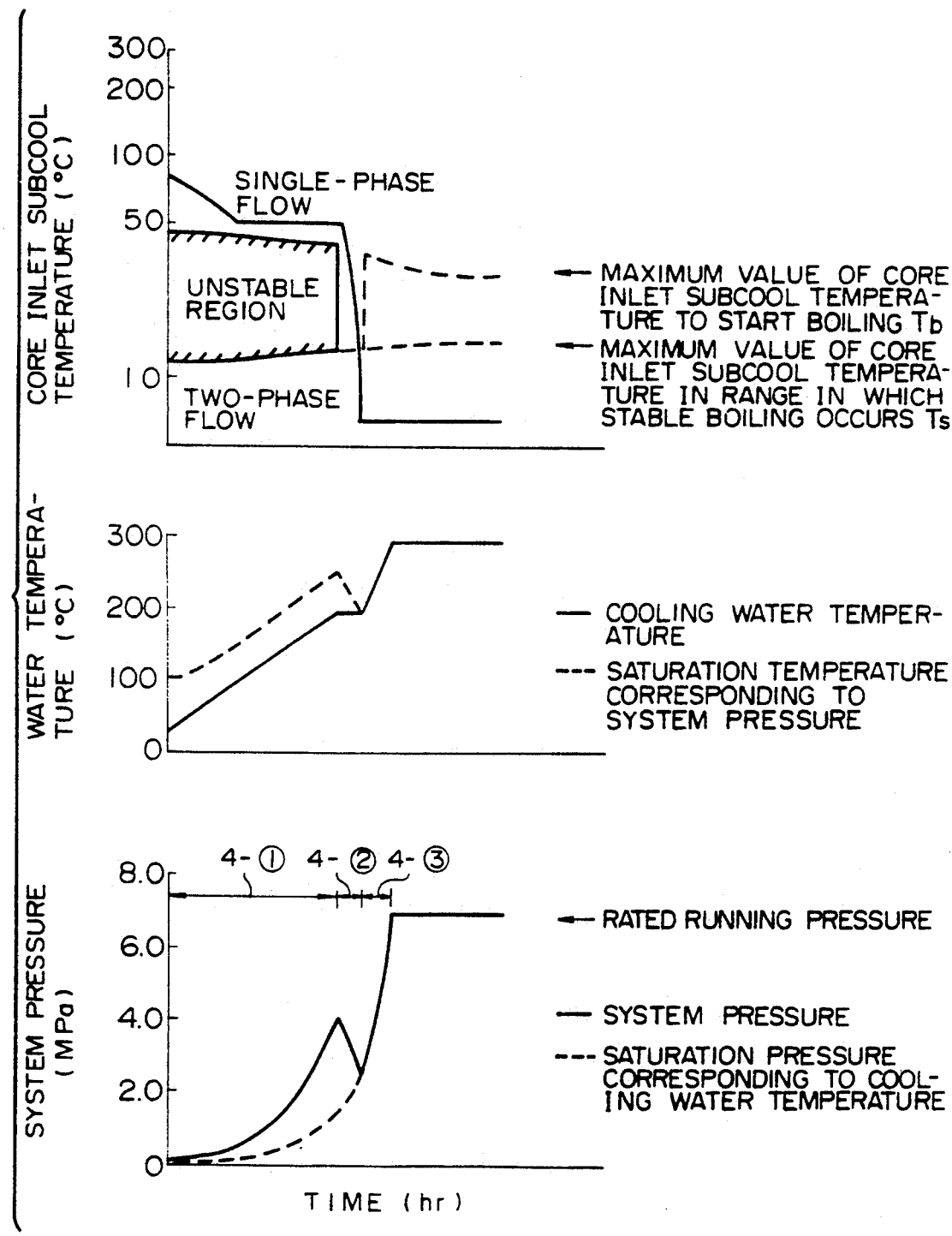
FIG. 9 shows graphs illustrating temporal changes of the pressure and temperature of the reactor system and the subcool temperature at the core inlet in the start-up process according to a third embodiment of the present invention.

A third embodiment of the invention will be described with reference to FIG. 9. In the embodiment shown in FIG. 8, in the start-up process of the natural circulation boiling water reactor, the system pressure P1 is reduced by the pressure regulator 44 while the control rods 3 are continuously withdrawn and the raising of the cooling water temperature T2 is allowed in the step 4-② in FIG. 8. In this embodiment shown in FIG. 9, the control rods 3 is once inserted into the core 2 to reduce the power of the core 2 and, at the same time, the system pressure P1 is reduced by the pressure regulator 44 (4-② in FIG. 9). Accordingly, there is no occurrence of boiling at the time of the reducing of the system pressure P1, because heat of nuclear reaction in the core 2 is suppressed. Accordingly, the core inlet subcool temperature can be reduced to a value not larger than the maximum value Ts of subcool temperature in a range which stable boiling occurs, while the occurrence of unstable phenomena is prevented substantially perfectly. The cooling water can be heated in a two-phase flow state by heat of nuclear reaction produced in the core 2 by withdrawing the control rods 3 again after inducing boiling by reduction of pressure in the cooling water by successively approximating the system pressure P1 to the saturation pressure P2 to satisfy the aforementioned condition (3) (4-③ in FIG. 9). In this embodiment in FIG. 9, the occurrence of unstable fluidity phenomena can be prevented substantially perfectly, because there is no boiling in the core 2 when the core inlet subcool temperature of the cooling water passes between the maximum value Tb of subcool temperature to start boiling and the maximum value Ts of subcool temperature in a range which stable boiling occurs.

The suppression of heat of nuclear reaction at the time of the reducing of pressure may be made by reducing heat of nuclear reaction given to the cooling water by partially inserting the control rods 3 into the core or may be made by once stopping the heat of nuclear reaction. The latter is shown in FIG. 9, in which the temperature of the cooling water is substantially kept constant.

According to the embodiment, in addition to the effects in the second embodiment, there arises an effect that a more stable start-up process of the reactor can be provided.

Modifications

Figure 10:
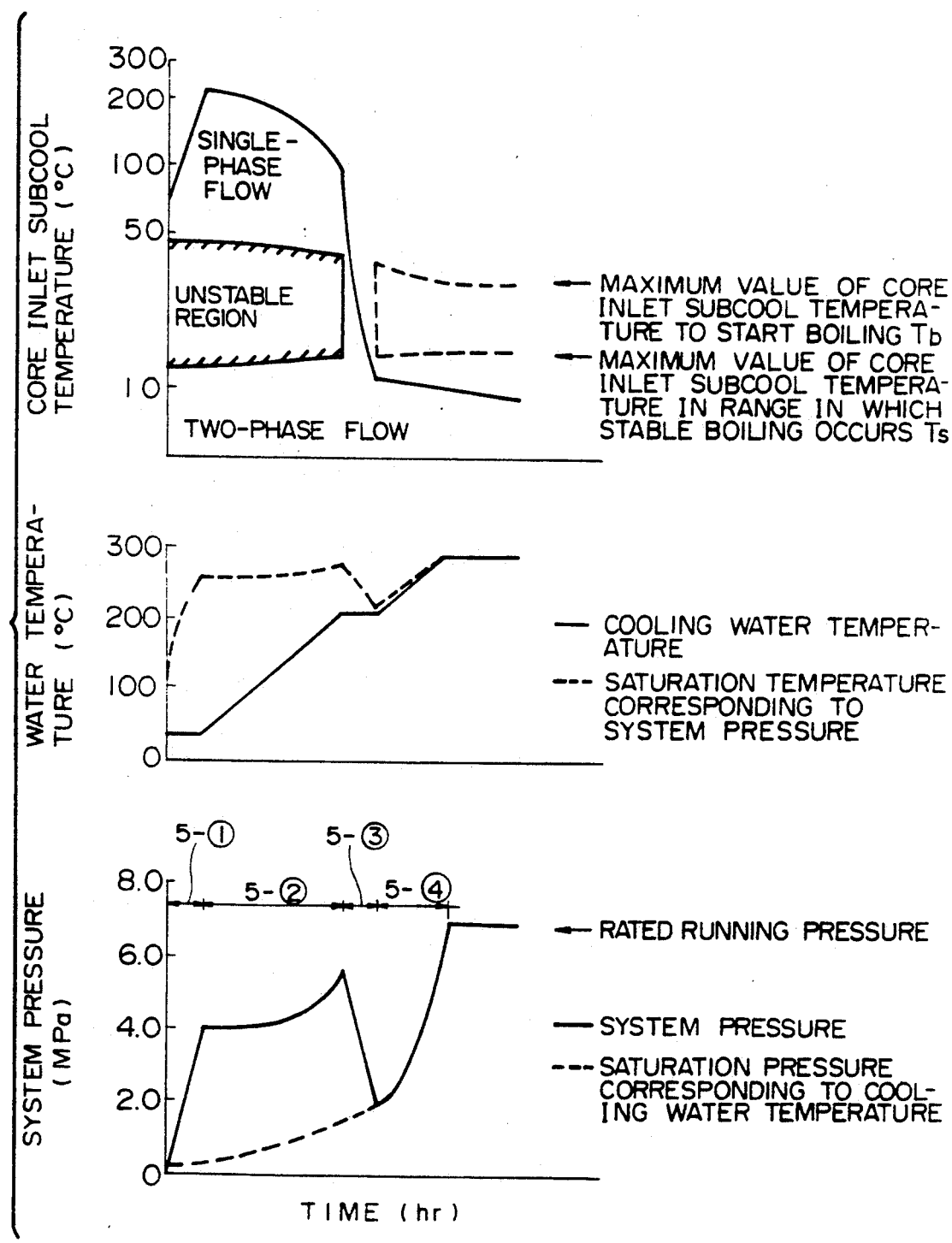
FIG. 10 shows graphs illustrating temporal changes of the pressure and temperature of the reactor system and the subcool temperature at the core inlet in the start-up process according to another modification of the present invention.
Figure 11:
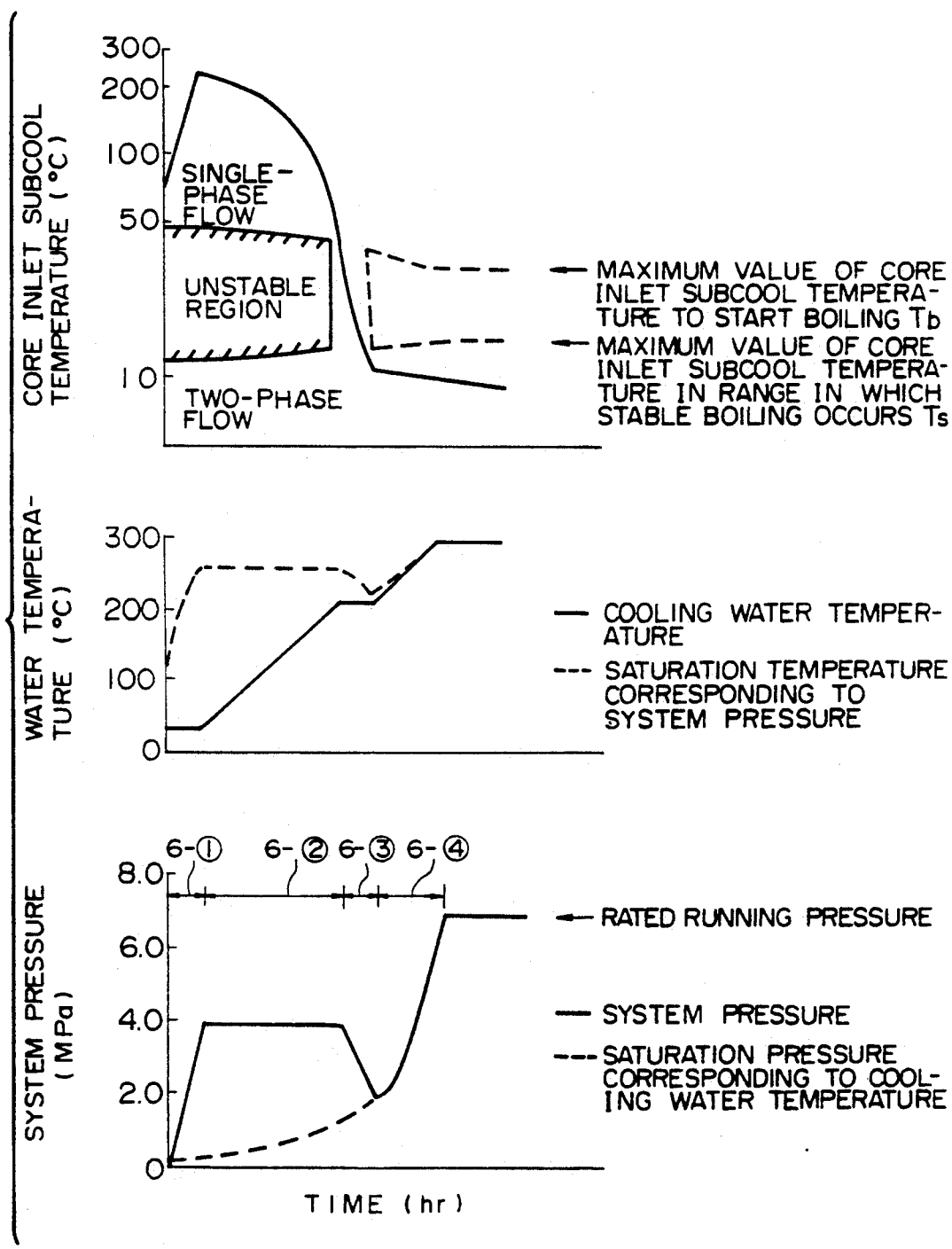
FIG. 11 shows graphs illustrating temporal changes of the pressure and temperature of the reactor system and the subcool temperature at the core inlet in the start-up process according to another modification of the present invention.
Figure 12:
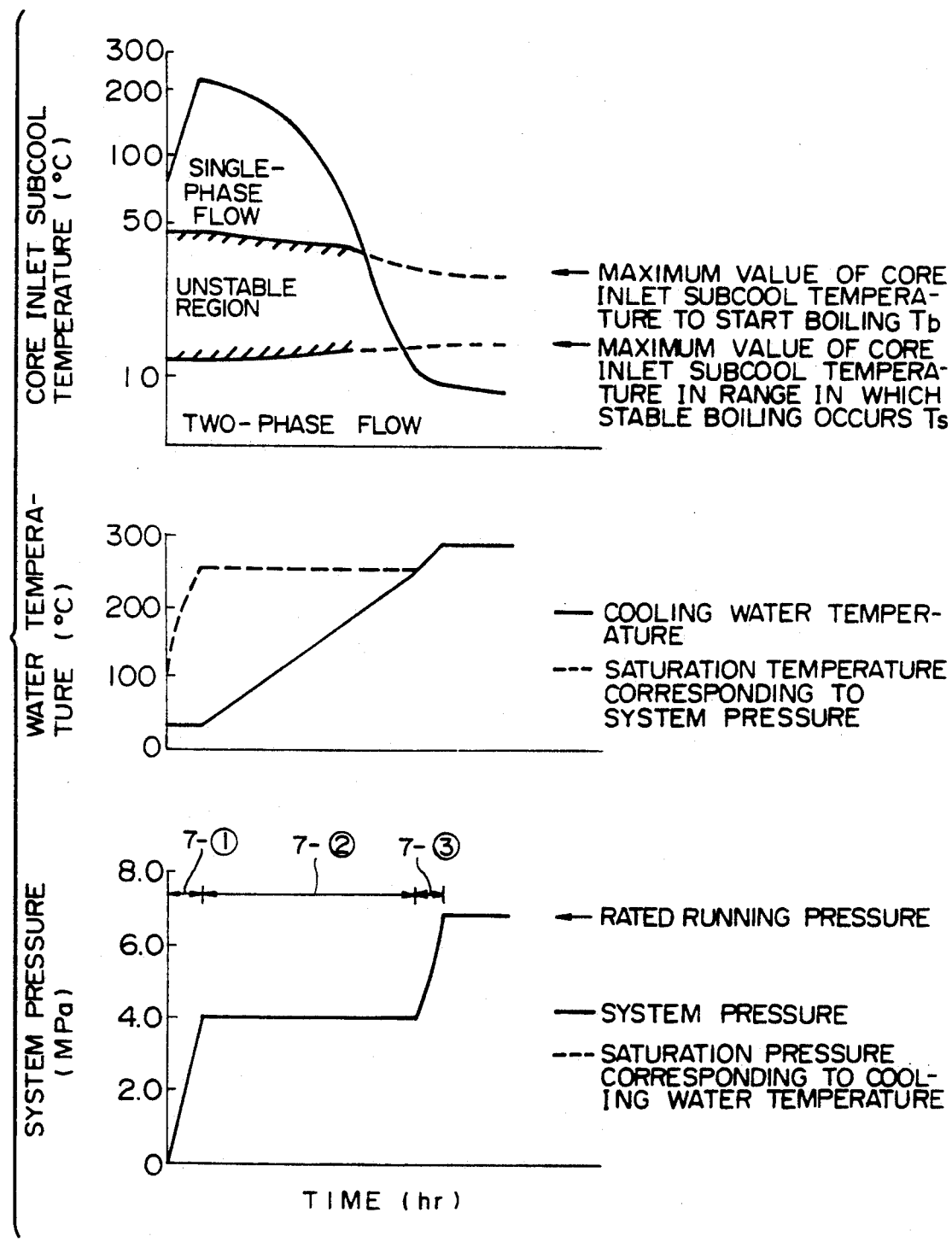
FIG. 12 shows graphs illustrating temporal changes of the pressure and temperature of the reactor system and the subcool temperature at the core inlet in the start-up process according to a further modification of the present invention.

Some modifications related to the procedure to the step of heating the cooling water to high temperature in a single-phase flow state will be described with reference to FIGS. 10 through 12. In FIG. 10, when the system pressure is preparatorily increased by the pressure regulator 44 at the time of the starting of the heating of the cooling water, the system pressure P1 is increased directly to the level satisfying the aforementioned condition (1) (see 5-① in FIG. 10), and then the pressurization (pressure control) by the pressure regulator 44 is stopped until the cooling water is heated to the target temperature. As a result, the system pressure naturally increases as the saturation vapor pressure increases with the raising of the the cooling water temperature (see 5-② in FIG. 10). Thereafter, the same procedure as in the third embodiment is applied to this modification. In FIG. 11, the pressurization (pressure control) by the pressure regulator 44 is released to suppress the increase of the saturation vapor pressure to keep the system pressure constant until the cooling temperature is heated to the target temperature after the system pressure P1 is increased in the embodiment shown in FIG. 10 (see 6-② in FIG. 11). In FIG. 12, the system pressure is continuously kept constant even in the case where the state of the cooling water is transited from a single-phase flow state to a two-phase flow state (see 7-② FIG. 12), and this corresponds to a combination of the steps 6-① and 6-② in FIG. 11 and the steps 3-② and 3-③ in FIG. 7. Also in these modifications, not only the same effect as in the second or third embodiment can be obtained but there arises an effect that the start-up process can be simplified because pressure control can be made easily after necessary pressure is preparatorily obtained at the time of the starting of the heating of the cooling water.

Fourth Embodiment

Figure 13:
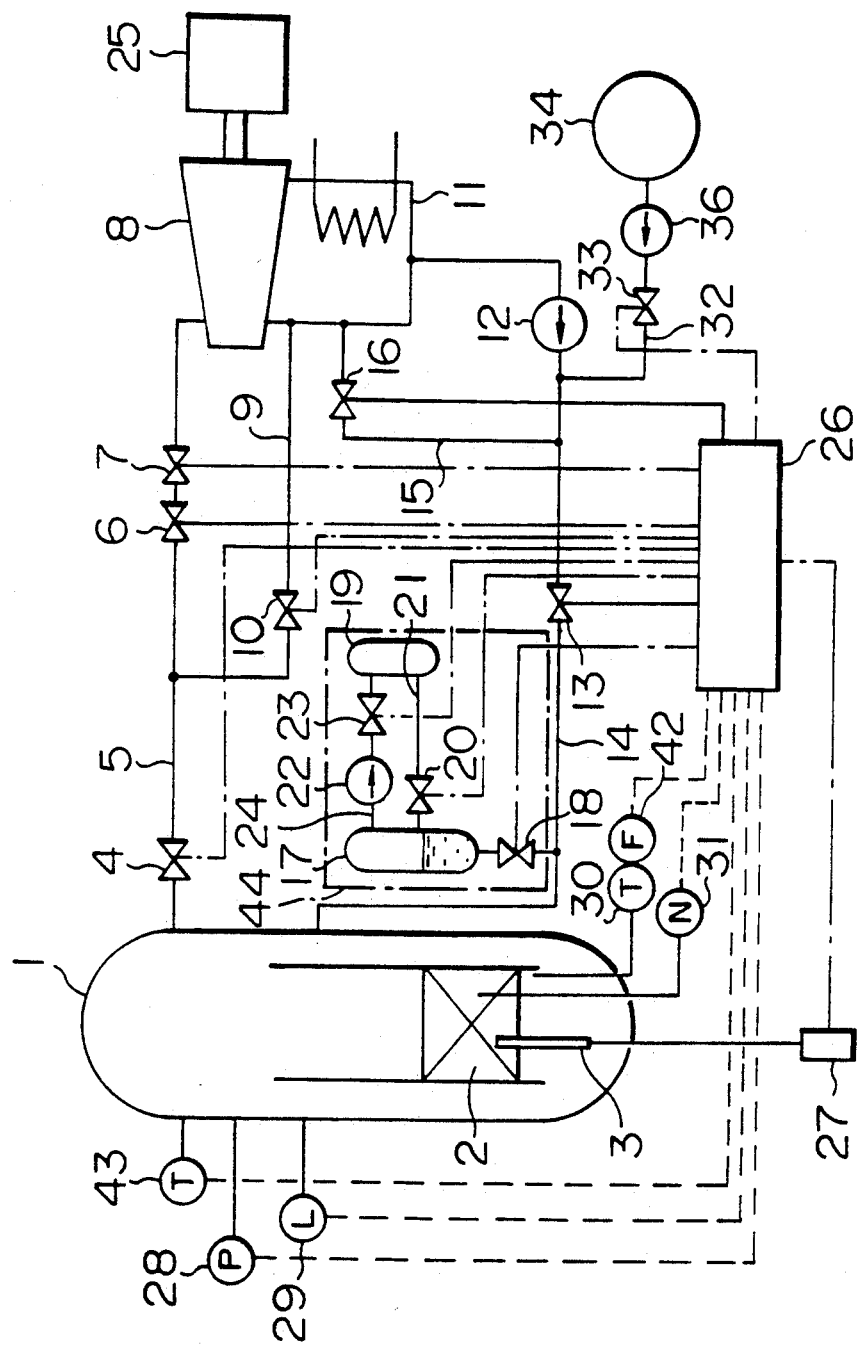
FIG. 13 is a system diagram illustrating the whole configuration of the natural circulation reactor in which the start-up process according to a fourth embodiment of the present invention is carried out and showing a step of the start-up process.

A fourth embodiment of the invention will be described with reference to FIG. 13. In this embodiment, the natural circulation boiling water reactor has, in addition to the natural circulation boiling water reactor of the first embodiment, an arithmetic operation controller 26 for controlling the opening/closing of the main steam isolation valve 4, the turbine steam stop valve 6, the turbine bypass stop valve 10, the feed water stop valve 13, the feed water bypass stop valve 16, the condensate feed/drain valve 33, the turbine steam flow rate control valve 7, the valve 18, the valve 20 and the valve 23 as well as controlling a control rod driving mechanism 27 by calculating optimum valve control values and control rod insertion values on the basis of the measured values of state quantities of respective reactor parts. As the state quantities of respective reactor parts, the pressure in the pressure vessel 1 is measured by a pressure gauge 28; the water level is measured by a water level gauge 29; the water temperature is measured by a water temperature gauge 43; the cooling water temperature and the circulation flow rate in the inlet of the core 2 are measured by a flowmeter 42 and a water temperature gauge 30, respectively; and the power of the core 2 is measured by a neutron detector 31.

The start-up process of the first embodiment shown in FIG. 2 will be described hereunder as an example of the reactor start-up process of this embodiment using the arithmetic operation controller 26.

At start-up of the reactor after ordinary shut-down, the reactor primary cooling water system comprising the pressure vessel 1, the main steam line 5 and the feed water line 14 is filled with water and then the main steam isolation valve 4, the turbine steam stop valve 6, the feed water stop valve 13 and the turbine bypass stop valve 10 are closed. Further, the feed water bypass stop valve 16 is opened and the feed water pump 12 is driven to circulate feed water to the condenser 11. Then, the valve 20 is opened by the arithmetic operation controller 26 and the opening thereof is adjusted in accordance with the pressure of the pressure vessel 1 measured by the pressure gauge 28 while the pressure P1 in the pressure vessel 1 is increased by the pressure regulator 44. In the case of FIG. 2, the system pressure is increased to 0.5 MPa.

Then, the cooling water is heated by heat of nuclear reaction produced in the core 2 by withdrawing the control rods 3 while monitoring the pressure in the pressure vessel 1, the output power of the core 2, the temperature of the cooling water, the cooling water temperature in the inlet of the core 2 (core inlet subcool temperature) and the flow rate therein by the pressure gauge 28, the neutron detector 31, the water temperature gauge 43, the water temperature gauge 30 and the flowmeter 42 on the basis of the arithmetic operation controller 26. At this time, an optimum quantity of heat of nuclear reaction is calculated by the arithmetic operation controller 26 on the basis of the values measured by the pressure gauge 28, the neutron detector 31, the water temperature gauge 43, the water temperature gauge 30 and the flowmeter 42 and feeds a control signal to the control rod driving mechanism 27 to set the amounts of withdrawal of the control rods 3. The amounts of withdrawal of the control rods 3 are set such that the thermal power of the core is smaller than the critical thermal power of the single-phase flow calculated on the basis of the cooling water temperature, the system pressure and the core flow rate. At this time, the cooling water is in a pressurized state, so that the subcool temperature is higher than the maximum value Tb of core inlet subcool temperature to start boiling and the state of the cooling water is still in a single-phase flow state.

Then, the arithmetic operation controller 26 feeds a control signal to the pressure regulator 44 to keep the cooling water in the pressurized state so that not only the system pressure P1 is always higher than the saturation pressure of the cooling water but the core inlet subcool temperature is higher than the maximum value Tb of core inlet subcool temperature to start boiling as the cooling water temperature is raised over 100° C., on the basis of the values measured by the pressure gauge 28, the water temperature gauge 43 and the water temperature gauge 30 monitored by the arithmetic operation controller 26. After the cooling water temperature is heated to a temperature (about 200° C. in the case of FIG. 5) at which the occurrence of unstable phenomena caused by the two-phase flow at low temperature is suppressed, not only the arithmetic operation controller 26 feeds a control signal for releasing the pressurization to the pressure regulator 44 but the arithmetic operation controller 26 feeds control signals for adjusting the respective openings of the main steam isolation valve 4 and the turbine bypass stop valve 10 while monitoring the measured values of cooling water temperature and pressure, to thereby gradually approximate the system pressure P1 to the saturation pressure corresponding the cooling water temperature. As a result, the cooling water at high temperature flows in a part of the main steam line 5 and in the turbine bypass line 9 and evaporated to produce a vapor phase, so that a water level is formed in the pressure vessel 1. Further, the core inlet subcool temperature is lowered to be lower than the maximum value Ts of core inlet subcool temperature in a range in which stable boiling occurs, so that the cooling water is in a high temperature and low subcool temperature state in which boiling occurs easily. In this step, the arithmetic operation controller 26 feeds control signals for opening/closing the condensate feed/drain valve 33 and the feed water stop valve 13 to obtain a proper water level in the pressure vessel 1, on the basis of the value measured by the water level gauge 29. As a result, the water level in the pressure vessel 1 is adjusted. By the aforementioned procedure, boiling of the cooling water occurs in the core 2, so that the state of the cooling water in the core 2 is transited from a single-phase flow state to a two-phase flow state.

At this time, the arithmetic operation controller 26 calculates an optimum quantity of heat of nuclear reaction on the basis of the values measured by the pressure gauge 28, the neutron detector 31, the water temperature gauge 43, the water temperature gauge 30 and the flowmeter 42 and feeds a control signal to the control rod driving mechanism 27 to set the amounts of withdrawal of the control rods 3. Here, the amounts of withdrawal of the control rods 3 are set such that the thermal power of the core is smaller than the critical thermal power of the two-phase flow calculated on the basis of the cooling water temperature, the system pressure and the core flow rate.

As the system pressure and the temperature are gradually approximated to the rated running pressure and temperature, water feeding into the pressure vessel 1 is started by opening the feed water valve 13 through the arithmetic operation controller 26. When the system pressure and the temperature reach the rated running pressure and temperature, the rotating of the turbine 8 is started by opening the turbine steam stop valve 6 and the turbine steam flow rate control valve 7 and closing the turbine bypass stop valve 10 through the arithmetic operation controller 26. At this time, the respective openings of the feed water stop valve 13 and the turbine steam flow rate control valve 7 are adjusted by the arithmetic operation controller 26 so that the pressure, temperature and water level in the pressure vessel 1 are respectively kept constant.

According to the embodiment, in addition to the effects in the first, second and third embodiments, there arise effects in that the start-up process of the natural circulation boiling water reactor is simplified and in that control of pressure, water temperature and water level can be improved.

Fifth Embodiment

Figure 14:
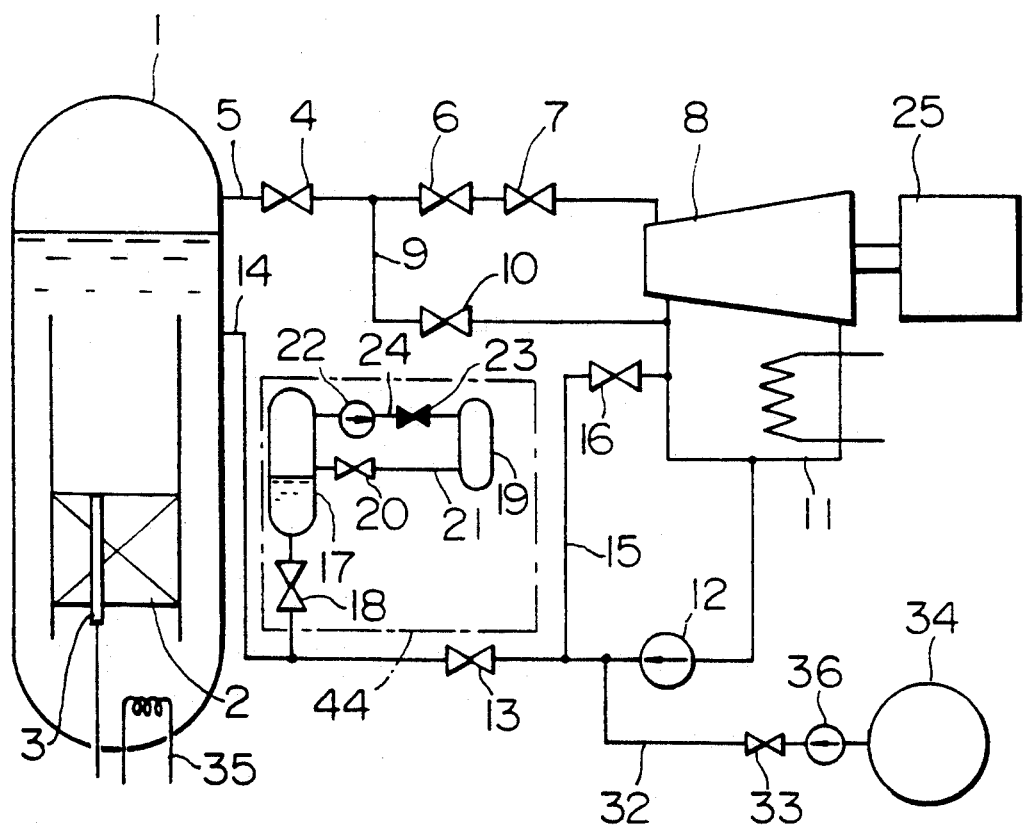
FIG. 14 is a system diagram illustrating the whole configuration of the natural circulation reactor in which the start-up process according to a fifth embodiment of the present invention is carried out and showing a step of the start-up process.

A fifth embodiment will be described hereunder with reference to FIG. 14. In this embodiment, the natural circulation boiling water reactor has, in addition to the configuration of the first embodiment, an electric heater 35 provided in a lower plenum below the core 2 in the pressure vessel 1.

At start-up of the reactor after ordinary shut-down, the cooling water in the pressure vessel 1 is heated, by using the heater 35 auxiliarily, to a temperature at which there is no occurrence of unstable phenomena caused by the two-phase flow at low temperature. The auxiliary heating by the heater 35 may be used over the all steps 1-①, 1-②, 1-③ and 1-④ in the case of FIG. 2 or may be used in part of the steps, for example, 1-② and 1-③ after pressurization. A stable high-temperature two-phase flow state is obtained by using the auxiliary heating by the heater 35. Then, after the raising of the cooling water temperature, the control rods 3 are continuously withdrawn to heat the cooling water in a two-phase flow state by heat of nuclear reaction to thereby obtain predetermined turbine driving steam temperature and pressure. Then, the rotating of the turbine is started by opening the turbine steam stop valve 6 and the turbine steam flow rate control valve 7 and closing the turbine bypass stop valve 10.

According to the embodiment, in addition to the effects in the first embodiment, there arises an effect that the start-up time of the reactor can be shortened.

Sixth Embodiment

Figure 15:
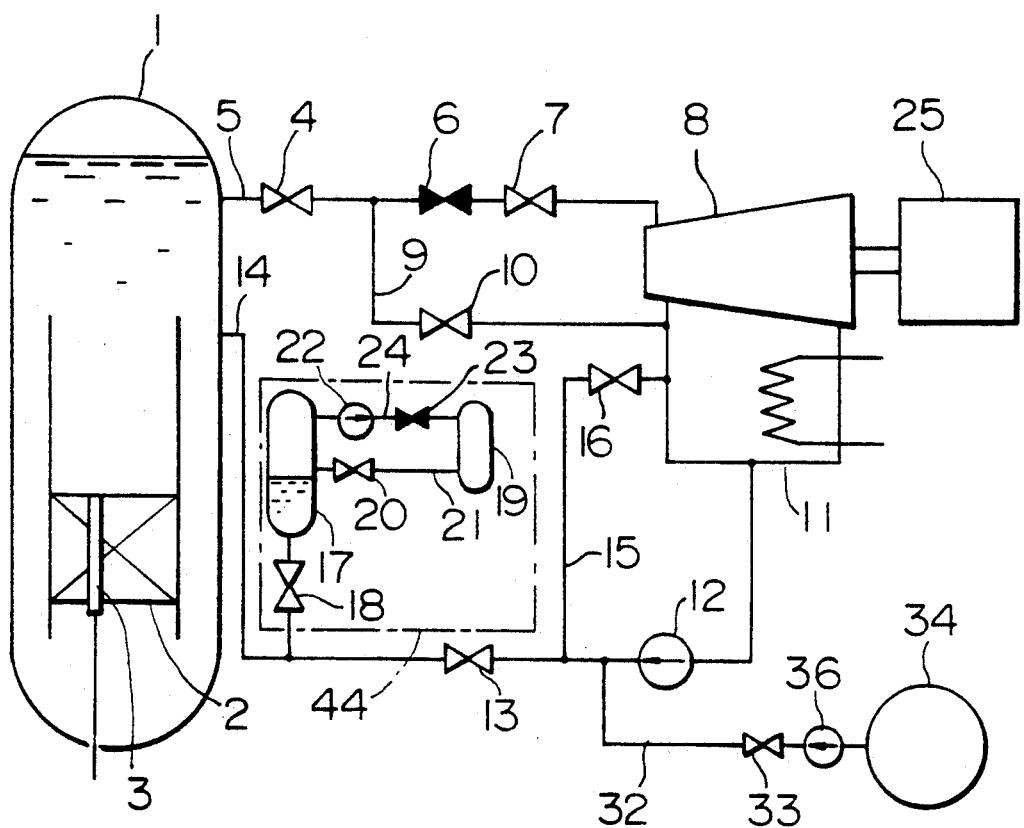
FIG. 15 is a system diagram illustrating the whole configuration of the natural circulation reactor in which the start-up process according to a sixth embodiment of the present invention is carried out and showing a step of the start-up process.

A sixth embodiment of the invention will be described hereunder with reference to FIG. 15. In FIG. 15, black-painted valves show the condition that the valves are closed, and white-painted valves show the condition that the valves are opened. In this embodiment, the main steam isolation valve 4 and the turbine bypass stop valve 10 are opened and the turbine steam stop valve 6 is closed at start-up of the reactor after ordinary shut-out. The feed water pump 12 is operated to circulate the feed water to the feed water line 14, the pressure vessel 1, the main steam line 5 and the turbine bypass line 9. At this time, the cooling water is also heated by heat given to the cooling water through the rotation of the pump. The heating of the cooling water by heat given to the cooling water through the rotation of the pump is also used to heat the cooling water in the pressure vessel 1 to a temperature at which there is no occurrence of unstable phenomena caused by the two-phase flow at low temperature. That is, the auxiliary heating by the rotation of the pump may be used over the all steps 1-①, 1-②, 1-③ and 1-④ in the case of FIG. 2 or may be used in part of the steps, for example, 1-② and 1-③ after pressurization. A stable high-temperature two-phase flow state is obtained by using the auxiliary heating by the rotation of the pump. Then, after the raising of the cooling water temperature, the control rods 3 are continuously withdrawn to heat the cooling water in a two-phase flow state by heat of nuclear reaction to thereby obtain predetermined turbine driving steam temperature and pressure. Then, the rotating of the turbine is started by opening the turbine steam stop valve 6 and the turbine steam flow rate control valve 7 and closing the turbine bypass stop valve 10.

Also in this embodiment, in addition to the effects in the first embodiment, there arises an effect that the start-up time of the reactor can be shortened.

Seventh Embodiment

Figure 16:
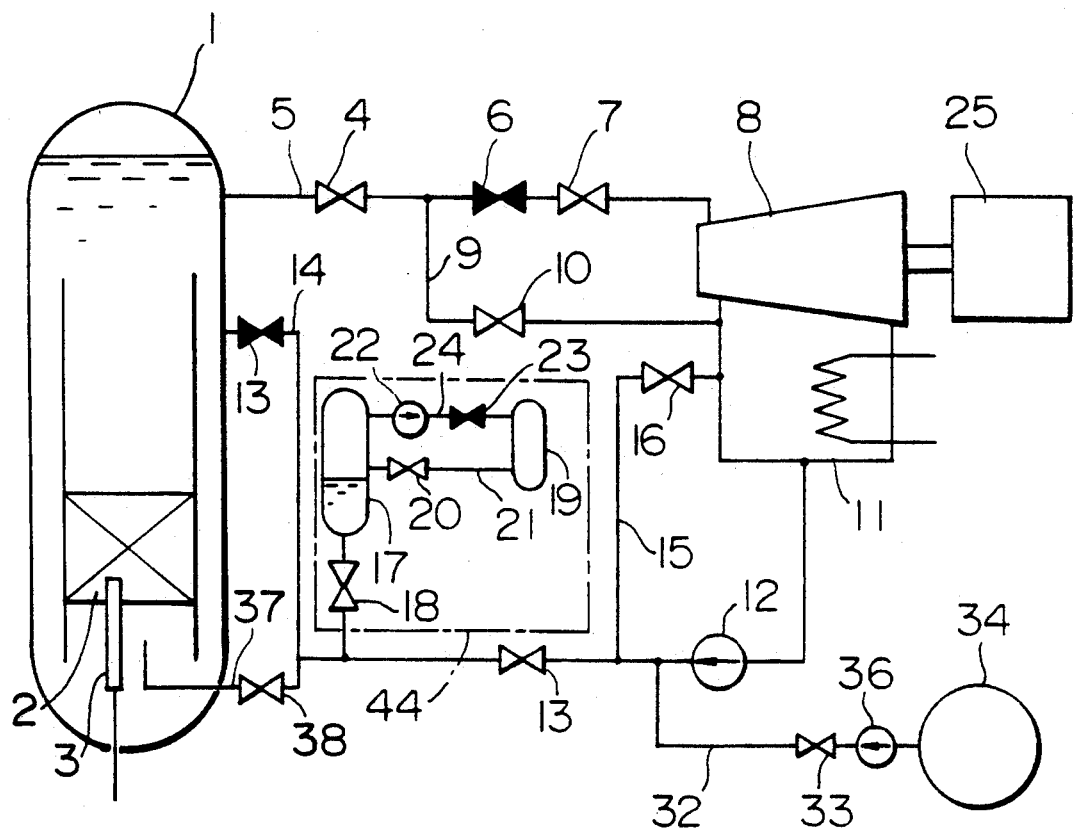
FIG. 16 is a system diagram illustrating the whole configuration of the natural circulation reactor in which the start-up process according to a seventh embodiment of the present invention is carried out and showing a step of the start-up process.

A seventh embodiment of the invention will be described hereunder with reference to FIG. 16. In FIG. 16, black-painted valves show the condition that the valves are closed, and white-painted valves show the condition that the valves are opened. In this embodiment, the natural circulation boiling water reactor has, in addition to the configuration of the first embodiment, a start-up feed water line 37 branched from the feed water line 14, and a start-up feed water stop valve 38 provided in the start-up feed water line 37. A cooling water outlet of the start-up feed water line 37 is connected to a lower plenum below the core 2 in the pressure vessel 1. At start-up of the reactor after ordinary shut-down, feed water is poured into the core 2 by closing the feed water stop valve 13, opening the valve 38 and operating the feed water pump 12. As a result, the cooling water can be forcedly circulated to the core 2 in the same manner as in the existing usual boiling water reactor. By using the forced circulation through the start-up feed water line 37, the cooling water in the pressure vessel 1 is heated to a temperature at which there is no occurrence of unstable phenomena caused by the two-phase flow at low temperature. That is, the forced circulation may be used over the all steps 1-①, 1-②, 1-③ and 1-④ in the case of FIG. 2 or may be used in part of the steps, for example, 1-② and 1-③. A stable high-temperature two-phase flow state is obtained by using the forced circulation. The flow rate of the circulation can be adjusted by the feed water bypass stop valve 16. After predetermined rated running steam temperature and pressure of the reactor are obtained, the rotating of the turbine is started by opening the turbine steam stop valve 6 and the turbine steam flow rate control valve 7 and closing the turbine bypass stop valve 10.

Also in this embodiment, in addition to the effects in the first embodiment, core stability can be improved as in the existing forced circulation boiling water reactor.

Other Embodiments

Figure 17:
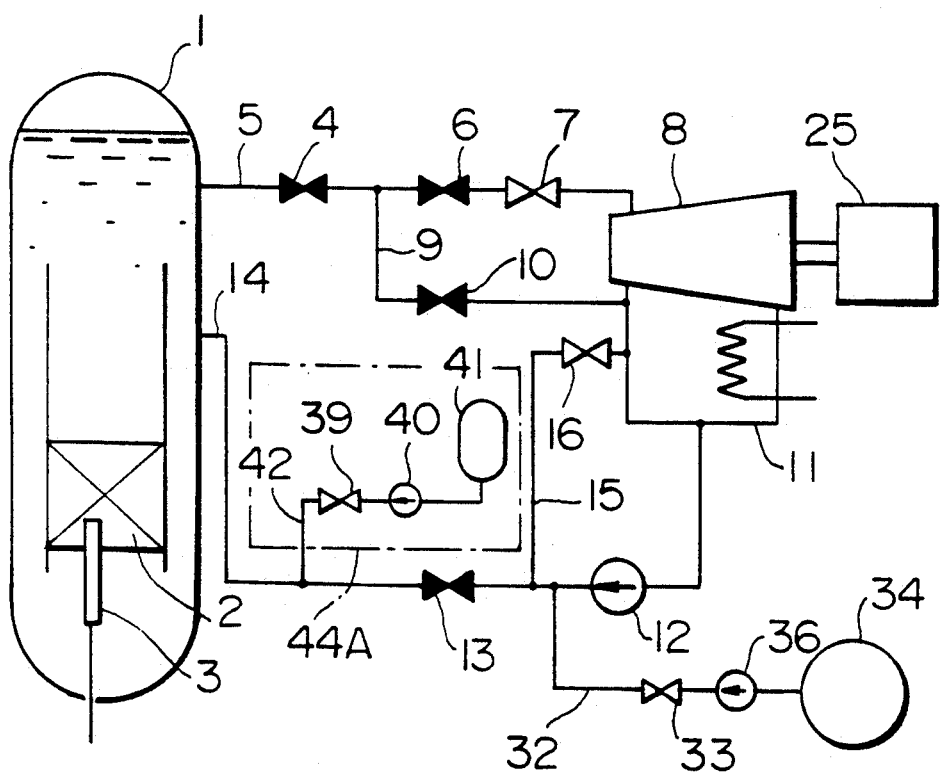
FIG. 17 is a system diagram illustrating the whole configuration of the natural circulation reactor in which the start-up process according to an eighth embodiment of the present invention is carried out and showing a step of the start-up process.

An eighth embodiment of the invention will be described hereunder with reference to FIG. 17. In FIG. 17, black-painted valves show the condition that the valves are closed, and white-painted valves show the condition that the valves are opened. In this embodiment, the natural circulation boiling water reactor has, in addition to the configuration of the first embodiment, a system 44A of leakage test for the pressure vessel 1 and the reactor primary cooling water system. The system 44A of leakage test is connected to the reactor primary cooling water system, as pressure control means, and includes a line 42, a valve 39, a constant pressure pump 40 and a cooling water tank 41. At start-up of the reactor after ordinary shut-down, the reactor primary cooling water system comprising the pressure vessel 1, the main steam line 5 and the feed water line 14 is pressurized by using the system 44A.

According to the embodiment, equipment used in service inspection is provided, so that apparatus related to the start-up of the reactor can be simplified. There arises an effect that the reactor can be improved both in economy and in reliability because of the simplification of the apparatus.

Figure 18:
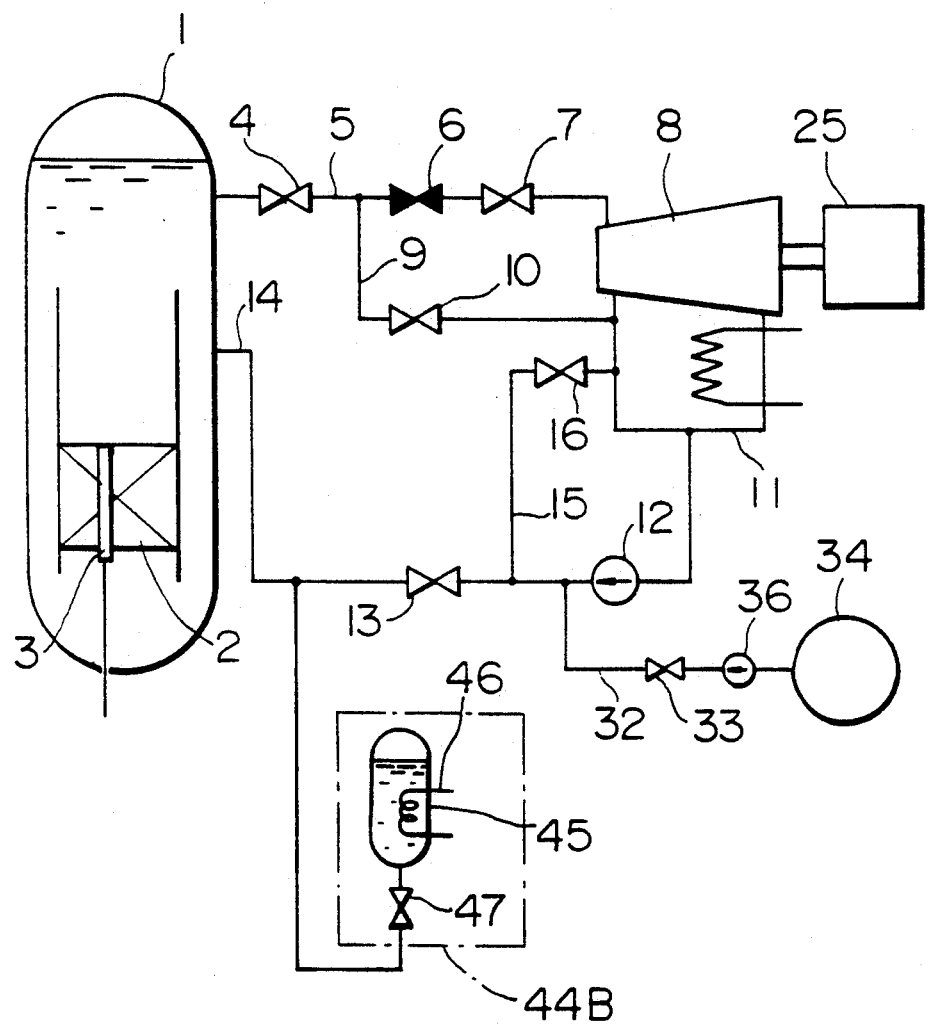
FIG. 18 is a system diagram illustrating the whole configuration of the natural circulation reactor in which the start-up process according to a ninth embodiment of the present invention is carried out and showing a step of the start-up process.

A ninth embodiment of the invention will be described hereunder with reference to FIG. 18. This embodiment is constituted by replacing the structure of the pressure regulator in the natural circulation boiling water reactor as shown in FIGS. 1 through 8 by the structure of the pressurizer in the existing pressurized reactor. That is, as shown in FIG. 18, the pressurizer in the pressurized reactor has a structure in which a pressurized tank 45 having a heater 46 in its inside is connected to the reactor primary cooling water system through a vale 47. In this embodiment, this is used as a pressure regulator 44B. In this embodiment, in the pressurizing step at start-up of the reactor (which corresponds to 1-② and 1-③ in the case of FIG. 2), water and steam in the pressurized tank 45 is pressurized by heating thereof by energizing the heater 46. Further, in the step of successively approximating the system pressure P1 to the saturation pressure corresponding to the cooling water temperature T2 (which corresponds to 1-④ in the case of FIG. 2), the pressure is controlled by lowering the temperature by stopping the heating by the heater 46 or by spraying water into the pressurized tank 45 by a sprinkler not shown.

According to the embodiment, since apparatus related to pressure regulation can be simplified, there arises an effect that the reactor can be improved in reliability on the start-up of the reactor.

Figure 19:
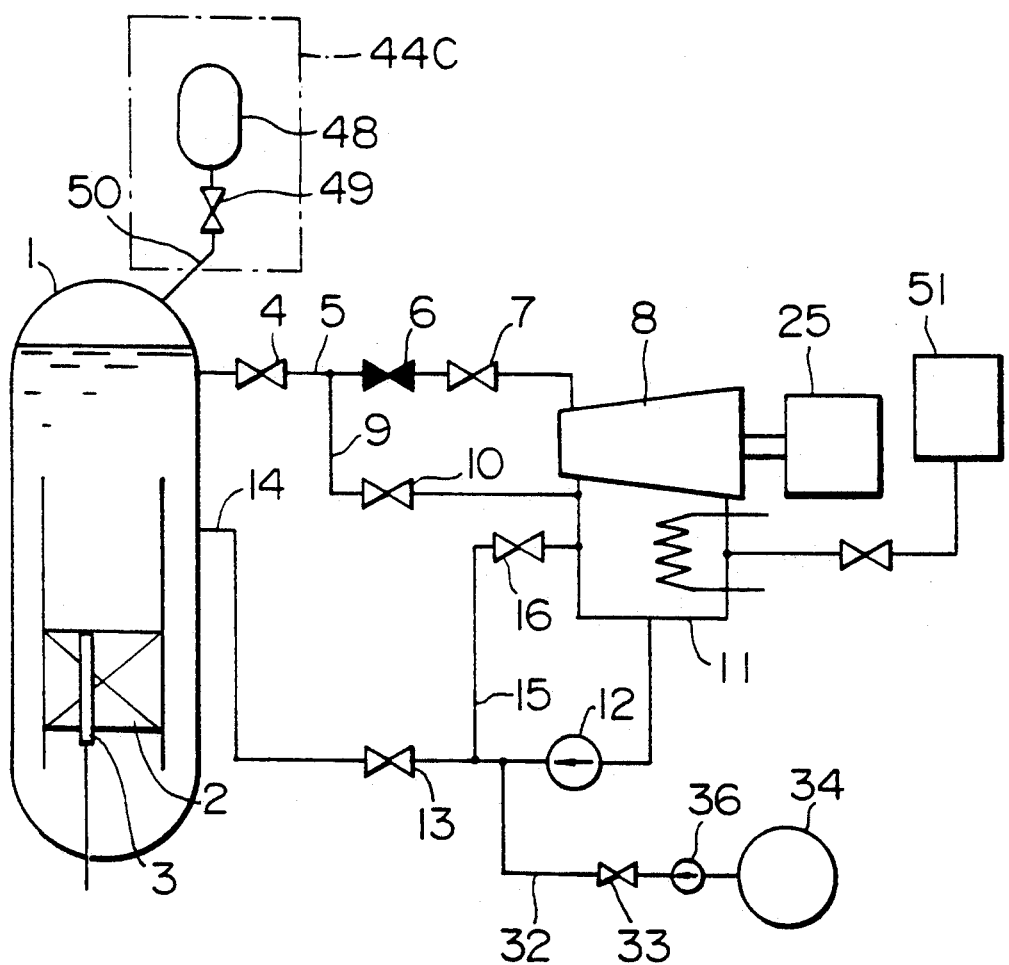
FIG. 19 is a system diagram illustrating the whole configuration of the natural circulation reactor in which the start-up process according to a tenth embodiment of the present invention is carried out and showing a step of the start-up process.

A tenth embodiment of the invention will be described hereunder with reference to FIG. 19. This embodiment is constituted by replacing the pressure regulator in the natural circulation boiling water reactor as shown in FIGS. 1 through 8 by a pressure regulator 44C which is connected to the reactor primary cooling water system such as the pressure vessel 1 and includes a high pressure gas tank 48, a valve 49 and a line 50. In this embodiment, in the pressurizing step at start-up of the reactor (which corresponds to 1-② and 1-③ in the case of FIG. 2), the water in the primary cooling water system is pressurized by supplying a high-pressure gas from the high pressure gas tank 48 to the reactor primary cooling water system through the valve 49 and the line 50. Further, in the step of successively approximating the system pressure P1 to the saturation pressure corresponding to the cooling water temperature T2 (which corresponds to 1-④ in the case of FIG. 2), the pressure is controlled by escaping the high pressure gas from the reactor primary cooling water system to a gas escape system 51 through the main steam isolation valve 4 and the turbine bypass stop valve 10. In the case where the pressure vessel 1 has a vent, the high pressure gas may be removed from the vent.

According to the embodiment, since apparatus related to pressure regulation can be simplified, there arises an effect that the reactor can be improved in reliability on the start-up of the reactor.

Figure 20:
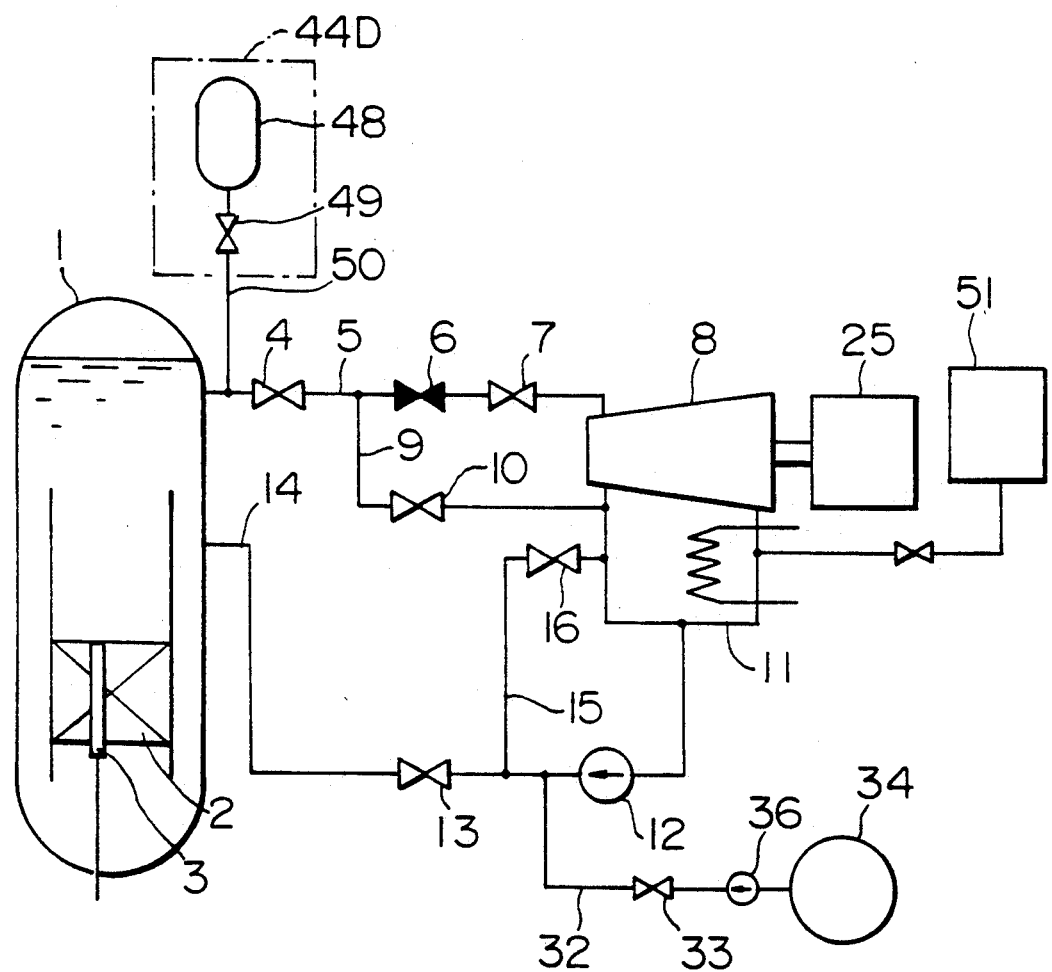
FIG. 20 is a system diagram illustrating the whole configuration of the natural circulation reactor in which the start-up process according to an eleventh embodiment of the present invention is carried out and showing a step of the start-up process.

An eleventh embodiment of the invention will be described hereunder with reference to FIG. 20. This embodiment is constituted by connecting the pressure regulator 44C shown in FIG. 19 to the main steam line 5 between the pressure vessel 1 and the main steam isolation valve 4. The same effect as in the tenth embodiment can be attained in this embodiment.

As described above, according to the present invention, there arises an effect that fluctuation in fluidity and lowering of core stability caused by the occurrence of unstable phenomena in the two-phase flow at low temperature can be prevented at the start-up of the natural circulation boiling water reactor to thereby make the start-up of the reactor stable. Further, there arises an effect that the start-up time of the reactor can be shortened to attain improvement both in economy and in reliability.

What is claimed is:

1. A start-up process of a boiling water nuclear reactor having a pressure vessel in which a core loaded with nuclear fuel is incorporated, cooling water is retained and steam is generated, wherein said process comprises:
   (a) first step of controlling the pressure in the pressure vessel so as to keep the cooling water in the pressure vessel in a single-phase flow state while raising the temperature of the cooling water by heat of nuclear reaction in the core, at the time of starting-up of said rector;
   (b) a second step of controlling at least the pressure in the pressure vessel so as to make said cooling water in said pressure vessel transit from said single-phase flow state into a two-phase flow state after said first step; and
   (c) a third step of heating said cooling water in said two-phase flow state by heat of nuclear reaction in the core.

2. A start-up process of a boiling water nuclear reactor according to claim 1, wherein in said first step said cooling water is kept in said single-phase flow state by controlling the pressure in said pressure vessel so as to make the pressure in said pressure vessel higher than the saturation pressure of said cooling water corresponding to the temperature of said cooling water in said pressure vessel.

3. A start-up process of a boiling water nuclear reactor according to claim 1, wherein in said first step the inside of said pressure vessel is pressurized solely first and thereafter said cooling water is heated while controlling the pressure in said pressure vessel.

4. A start-up process of a boiling water nuclear reactor according to claim 1, wherein in said first step the pressurization in the inside of said pressure vessel is started simultaneously with start of heating said cooling water so that the heating of said cooling water and the pressurization in the inside of said pressure vessel are carried out simultaneously and parallelly with each other.

5. A start-up process of a boiling water nuclear reactor according to claim 1, wherein said reactor comprises a start-up feed water line formed by bypassing a feed water line and having a start-up feed water stop valve, a cooling water outlet of said start-up feed water line being connected in a portion below said core in said pressure vessel, and wherein in at least one of said first, second and third steps, said cooling water is heated by nuclear reaction and at the same time said cooling water is forcedly circulated to said core by a feed water pump through said start-up feed water line to thereby increase the core flow rate.

6. A start-up process of a boiling water nuclear reactor according to claim 1, wherein in said second step said cooling water is made to transit from said single-phase flow state into said two-phase flow state by controlling the pressure in said pressure vessel so as to make the pressure in said pressure vessel gradually approximate to the saturation pressure of said cooling water corresponding to the temperature of said cooling water in said pressure vessel until predetermined pressure not higher than the rated running pressure of said reactor is reached.

7. A start-up process of a boiling water nuclear reactor according to claim 6, wherein said control on the pressure in said pressure vessel is performed so that the pressure in said pressure vessel is kept to be substantially constant to thereby make the pressure in said pressure vessel gradually approximate to said saturation pressure.

8. A start-up process of a boiling water nuclear reactor according to claim 6, wherein said control on the pressure in said pressure vessel is performed so that the pressure in said pressure vessel is reduced to thereby make the pressure in said pressure vessel gradually approximate to said saturation pressure.

9. A start-up process of a boiling water nuclear reactor according to claim 6, wherein when said control on the pressure in said pressure vessel is performed, the quantity of heat for heating said cooling water is reduced.

10. A start-up process of a boiling water nuclear reactor according to claim 6, wherein when said control on the pressure in said pressure vessel is performed, heating said cooling water is once stopped.

11. A start-up process of a boiling water nuclear reactor according to claim 1, wherein said second and third steps are performed in a single step of continuously controlling the pressure in said pressure vessel so as to make the pressure in said pressure vessel reach the saturation pressure of said cooling water corresponding to the temperature of said cooling water in said pressure vessel at the rated running pressure of said reactor.

12. A start-up process of a boiling water nuclear reactor according to claim 1, wherein said second step includes a step of controlling the pressure in said pressure vessel so as to make the pressure in said pressure vessel reach the saturation pressure of said cooling water corresponding to the temperature of said cooling water in said pressure vessel at predetermined pressure not higher than the rated running pressure of said reactor, and wherein said third step includes a step of increasing the pressure in said pressure vessel by heating said cooling water.

13. A start-up process of a boiling water nuclear reactor according to claim 1, wherein said first step includes a step of calculating a first critical thermal power in said single-phase flow on the basis of respective measured values of the temperature of said cooling water, the pressure in said pressure vessel, and the flow rate of said core to thereby set amounts of withdrawal of control rods for controlling an power of said core so that the thermal power of said core becomes not larger than said first critical thermal power, and wherein said third step includes a step of calculating a second critical thermal power in said two-phase flow on the basis of respective measured values of the temperature of said cooling water, the pressure in said pressure vessel, and the flow rate of said core to thereby set the amounts of withdrawal of said control rods so that the thermal power of said core becomes not larger than said second critical thermal power.

14. A start-up process of a boiling water nuclear reactor according to claim 1, wherein said second and third steps include: a step of controlling related valves so as to keep the water level in said pressure vessel at a proper value on the basis of respective measured values of the pressure and water-temperature in said pressure vessel, the water temperature at an inlet of said core, the water level in said pressure vessel, the power of said core and the amounts of insertion of control rods; and a step of controlling respective openings of the related valves to make a flow rate of feed water proper on the basis of respective measured values of the power of said core and the subcool temperature at the inlet of said core.

15. A start-up process of a boiling water nuclear reactor according to claim 1, said reactor comprising: a main steam line for feeding steam generated in said core to a turbine; a feed water line for feeding condensate water condensed in a condenser after driving of said turbine into said pressure vessel as cooling water; a main steam isolation valve, a turbine steam stop valve for stopping a steam flow into said turbine, and a control valve for controlling a flow rate of a steam flow into said turbine which are arranged in said main steam line; a feed water pump and a feed water stop valve which are arranged in said feed water line; a turbine bypass line for connecting said main steam line to an inlet of said condenser at a portion of said main steam line between said main steam isolation valve and said turbine steam stop valve; a turbine bypass stop valve arranged in said turbine bypass line; control rods for controlling the power of said core; and a pressure regulator provided in at least one of said pressure vessel, said main steam line and said feed water line; wherein said first step includes a step of isolating said pressure vessel by closing said main steam isolation valve and said feed water stop valve, a step of pressurizing the inside of said pressure vessel by said pressure regulator, and a step of heating said cooling water in said single-phase flow state by withdrawing said control rods; and said second and third steps include a step in which the pressurization by said pressure regulator is released and said main steam isolation valve and said turbine bypass stop valve are opened so that the pressure in said pressure vessel is reduced and a water level is formed in said pressure vessel.

16. A start-up process of a boiling water nuclear reactor according to claim 15, said reactor further comprising a feed water bypass line for connecting said feed water line, at a outlet side of said feed water pump, to said an inlet of said condenser, and a feed water bypass stop valve arranged in said feed water bypass line, wherein said first step further includes a step of closing said turbine steam stop valve and said turbine bypass stop valve, opening said feed water bypass stop valve and operating said feed water pump to thereby circulate feed water to said condenser, and thereafter pressurizing the inside of said pressure vessel.

17. A start-up process of a boiling water nuclear reactor according to claim 15, wherein said second step includes a step of inserting said control rods to reduce the power of said core after increase of the cooling water temperature, and said third step includes a step of withdrawing said control rods again to heat said cooling water in said two-phase flow state.

18. A start-up process of a boiling water nuclear reactor according to claim 1, wherein in said first step, said cooling water is heated by nuclear reaction while keeping said cooling water in the single-phase flow state by making the pressure P1 in said pressure vessel satisfy the condition $P1>P2$ while keeping the condition $T2<T1-Tb$, where T1 represents the saturation temperature of said cooling water at the pressure P1, T2 represents the temperature of said cooling water, P2 represents the saturation pressure corresponding to the temperature T2, and Tb represents the maximum value of core inlet subcool temperature to start boiling.

19. A start-up process of a boiling water nuclear reactor according to claim 1, wherein in said second step, said cooling water is made to transit from said single-phase flow state into said two-phase flow state by making the pressure P1 in said pressure vessel satisfy the condition $P1>P2$ while keeping the condition $T1<T2+Ts$, where T1 represents the saturation temperature of said cooling water at the pressure P1, T2 represents the temperature of said cooling water, P2 represents the saturation pressure corresponding to the temperature T2, and Ts represents the maximum value of core inlet subcool temperature in a region in which stable boiling occurs.

20. A start-up process of a boiling water nuclear reactor according to claim 1, wherein in said second step, said cooling water is made to transit from said single-phase flow state into said two-phase flow state by making the pressure P1 in said pressure vessel satisfy the condition $P1=P2$ while keeping the condition $T1<T2+Ts$, where T1 represents the saturation temperature of said cooling water at the pressure P1, T2 represents the temperature of said cooling water, P2 represents the saturation pressure corresponding to the temperature T2, and Ts represents the maximum value of core inlet subcool temperature in a region in which stable boiling occurs.

21. A start-up process of a boiling water nuclear reactor according to claim 1, wherein said reactor comprises an electric heater provided in at least one of said pressure vessel, said main steam line and said feed water line, and wherein in at least one of said first, second and third steps, said cooling water is heated by nuclear reaction and at the same time heated by said electric heater.

22. A start-up process of a boiling water nuclear reactor according to claim 1, wherein in at least one of said first, second and third steps, said cooling water is heated by nuclear reaction and at the same time heated by heat due to rotation of a feed water pump operated.

23. A start-up process of a boiling water nuclear reactor having a pressure vessel in which a core loaded with nuclear fuel is incorporated, cooling water is retained and steam is generated, wherein the cooling water in the pressure vessel is heated by nuclear reaction in the core while the pressure in said pressure vessel is controlled so as to be made higher than the saturation pressure of the cooling water corresponding to the temperature of the cooling water in said pressure vessel, and thereafter the pressure in said pressure vessel is made substantially coincident with the saturation pressure of the cooling water corresponding to the temperature of the cooling water in said pressure vessel whereupon the cooling water is heated.

24. A boiling water nuclear reactor comprising:
a pressure vessel in which a core loaded with nuclear fuel is incorporated, cooling water is retained and steam is generated;
pressure regulating means disposed outside said pressure vessel and made to communicate with said pressure vessel for pressurizing the inside of said pressure vessel at the time of starting-up of said reactor;

control rod drive means for moving control rods for insertion into and withdrawal from the core to control an output power of the core; and control means for actuating said pressure regulating means and said control rod drive means at the time of starting-up of said reactor in such a manner as to control the pressure in the pressure vessel so as to keep the cooling water in the pressure vessel in a single-phase flow state while raising the temperature of the cooling water by heat of nuclear reaction in the core, and then to control at least the pressure in the pressure vessel so as to make said cooling water in said pressure vessel transit from said single-phase flow state into a two-phase flow state, and thereafter to heat said cooling water in said two-phase flow state by heat of nuclear reaction in the core.

25. A boiling water nuclear reactor according to claim 24, wherein said pressure regulator means includes a pressurized tank connected to a feed water line connected to said pressure vessel for pressurizing the inside the pressure vessel, a high pressure gas tank connected to the pressurized tank for supplying to the pressurized tank a gas of pressure higher than the pressure vessel at the time of initiating starting-up of the reactor, means provided between said pressurized tank and said gas tank for controlling a supply of the gas from said gas tank to said pressurized tank, and means for controlling release of the pressure in the pressure vessel.

26. A boiling water nuclear reactor according to claim 24, wherein said pressure regulator means includes a leakage test system connected to a feed water line for testing leakage of said pressure vessel and a reactor primary cooling water line.

27. A boiling water nuclear reactor according to claim 24, wherein said pressure regulator means includes a pressurized tank connected to a feed water line connected to the pressure vessel and having an electric heater disposed therein for applying to the pressure vessel a pressure higher than the pressure vessel at the time of initiating starting-up of the reactor.

28. An boiling water nuclear reactor according to claim 24, wherein said pressure regulator means includes a high pressure gas tank connected to one of said pressure vessel and main steam line connected to the pressure vessel for supplying a gas of pressure higher than the pressure vessel at the time of initiating starting-up of the reactor.

* * * * *